US010432298B2

(12) United States Patent
Xu et al.

(10) Patent No.: US 10,432,298 B2
(45) Date of Patent: Oct. 1, 2019

(54) METHOD AND APPARATUS FOR DYNAMIC LOAD BALANCING OF COMMUNICATIONS CHANNELS FOR CONTROLLING TRAFFIC LOAD IN A COMMUNICATIONS SYSTEM

(75) Inventors: Jun Xu, Clarksburg, MD (US); John Border, Adamstown, MD (US); Robert Torres, New Market, MD (US); George Choquette, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 343 days.

(21) Appl. No.: 13/459,727

(22) Filed: Apr. 30, 2012

(65) Prior Publication Data

US 2013/0286830 A1 Oct. 31, 2013

(51) Int. Cl.
*H04B 7/185* (2006.01)
*H04W 74/08* (2009.01)

(52) U.S. Cl.
CPC ......... *H04B 7/18584* (2013.01); *H04W 74/08* (2013.01)

(58) Field of Classification Search
USPC ........ 370/229–235, 252, 253, 254, 255, 310
See application file for complete search history.

(56) References Cited

U.S. PATENT DOCUMENTS

| | | | |
|---|---|---|---|
| 5,862,452 A * | 1/1999 | Cudak et al. | 725/81 |
| 6,418,136 B1 * | 7/2002 | Naor | H04L 12/403 370/347 |
| 2006/0171418 A1 * | 8/2006 | Casini et al. | 370/474 |

* cited by examiner

Primary Examiner — Kevin C. Harper
Assistant Examiner — Mon Cheri S Davenport
(74) Attorney, Agent, or Firm — Potomac Technology Law, LLC

(57) ABSTRACT

A method and apparatus for dynamically balancing traffic loads in a communications system (such as satellite communications systems), based on a control of collision rates via the real-time control of throughput of channels of the communications system (such as a real time throughput of random access channels in a satellite network). The method and apparatus generates and transmits to remote nodes or terminals an operating probability based on the determined throughput for transmission using the communications channel. Also, the method and apparatus includes receiving by at least one terminal the generated operating probability and determining by the at least one terminal a transmission probability for the communications channel based upon the received operating probability, which can further be adjusted by one or more of a received upper or lower limit of the generated operating probability or a collision rate for the communications channel.

25 Claims, 18 Drawing Sheets

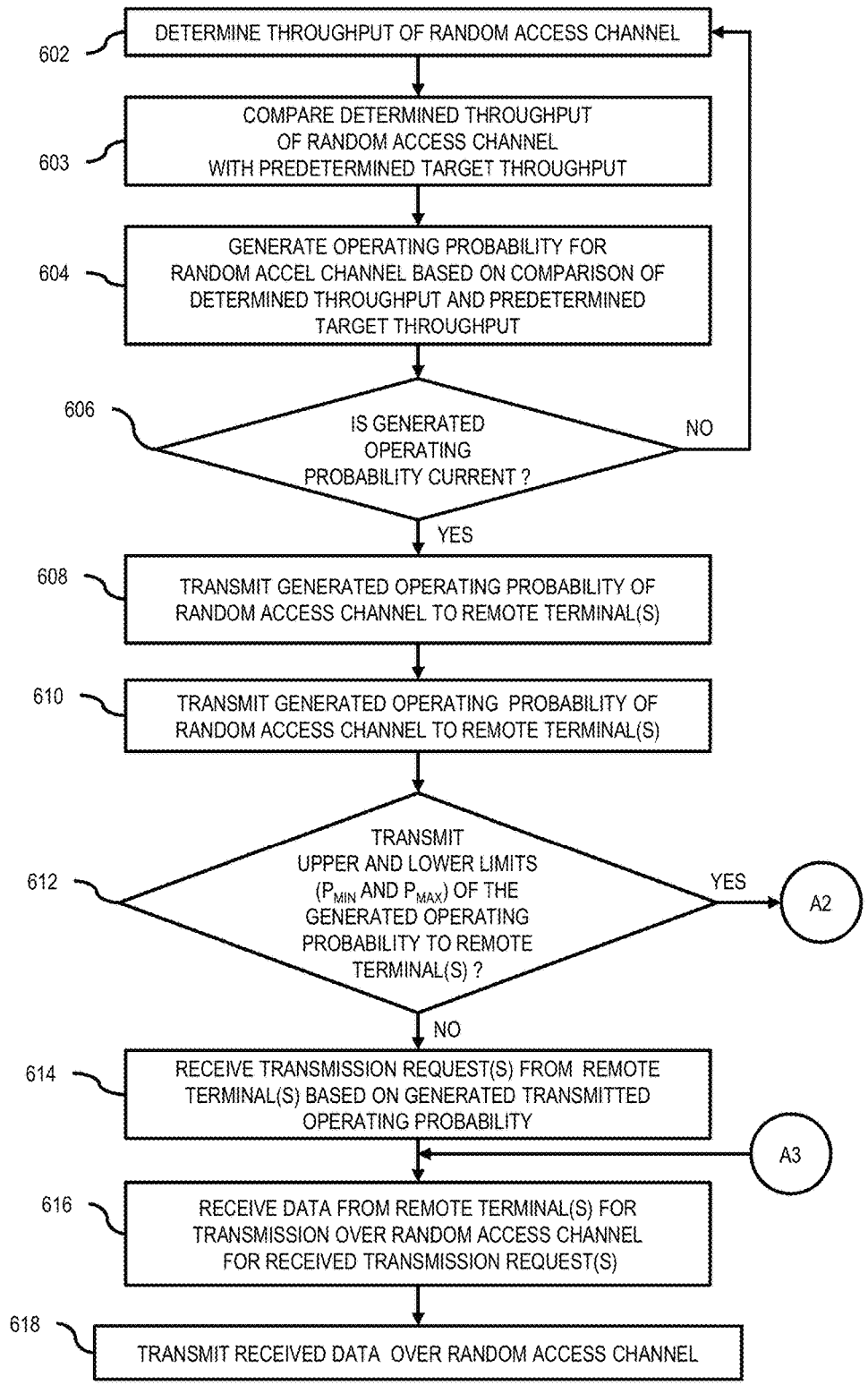

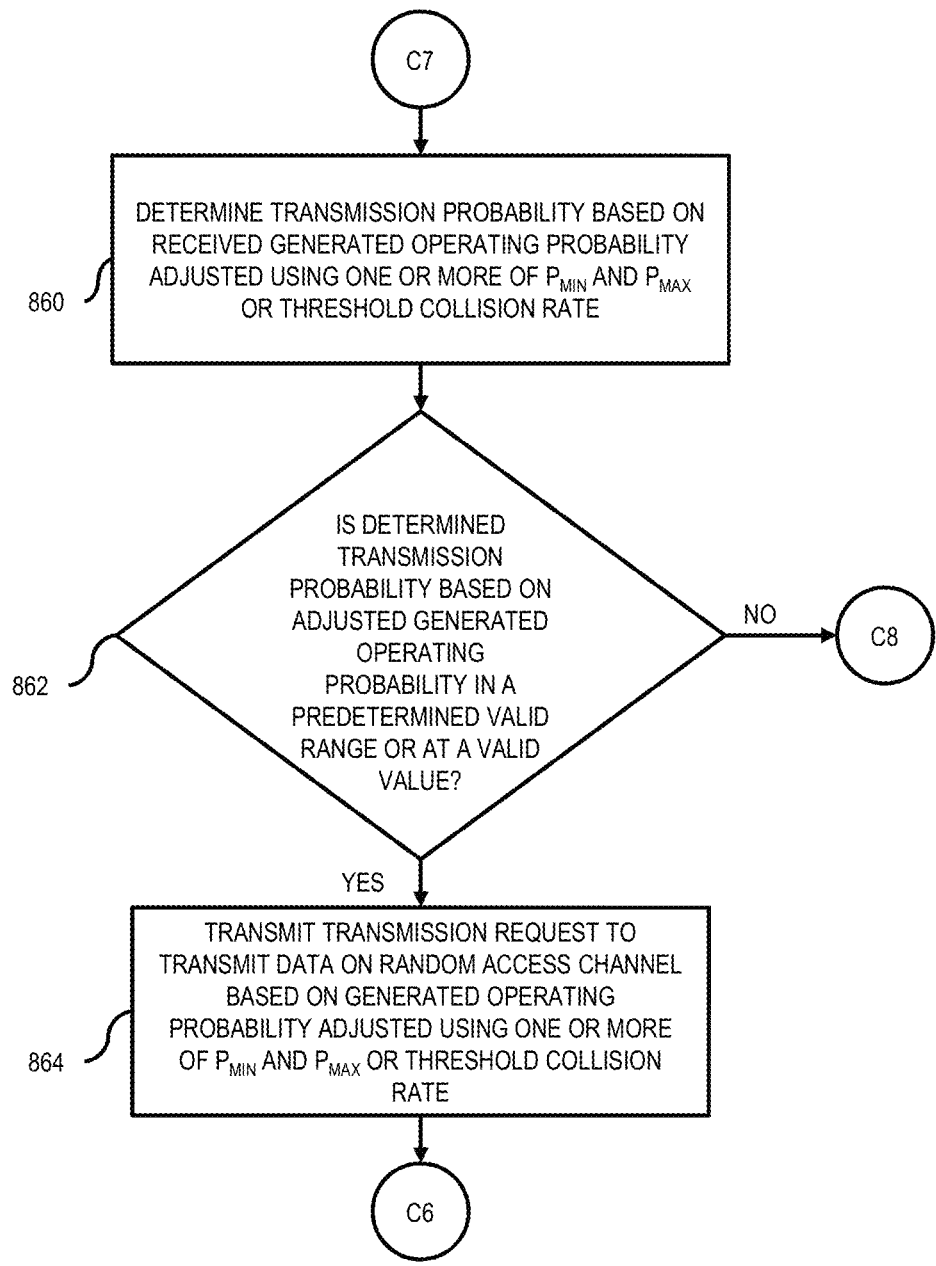

METHOD AND APPARATUS FOR DYNAMIC LOAD BALANCING OF COMMUNICATIONS CHANNELS FOR CONTROLLING TRAFFIC LOAD IN A COMMUNICATIONS SYSTEM

FIELD OF THE INVENTION

The present invention relates to a method and apparatus for dynamically balancing traffic loads in a communications system (such as satellite communications systems), based on a control of collision rates via the real-time control of throughput of communications channels serving a plurality of communications terminals (such as a real time throughput of random access channels in a satellite network).

BACKGROUND

The overall capacities of communications systems, such as satellite systems, are increasing exponentially, and such capacity increases present unique challenges in the associated system and network designs. As one example, the overall capacities of broadband satellites are increasing exponentially, and the goal of the system designers, system operators, and service providers is to support and provide efficient, robust, reliable and flexible services, in a shared bandwidth network environment, utilizing such high capacity satellite systems. In current systems, for example, where multiple remote nodes are capable of accessing a public network (e.g., the Internet) or a remote network through one or more aggregation nodes, transmission of data and information by a plurality of terminals at a given time can thus create challenges and inefficiencies in network management, especially where system loads dynamically change over given periods of time.

For example, in communications networks with long round trip time (RTT), the random access channel (for example, the Aloha channel) can also be used for transmitting data with stringent latency requirement, such as control message, real-time and interactive traffic. As an example, in the inroute (the direction from a remote terminal to the gateway) of the satellite network, the high priority traffic can be sent via the random access channels to avoid large latency due to the delay of TDMA slot allocation. Because of the innate collision characteristics of a random access channel, when the throughput increases, the collision rate of the random access channels also becomes higher, resulting in unwanted retransmissions which in turn bring increased latency in the transmission.

In common practice, there exists a mechanism which backs off the transmission time once a collision happens. It has a drawback that a terminal starts to take preventive action (i.e., back-off) only after a collision. In addition, the back-off time increases as more collisions occur. Therefore, such a legacy approach may not be efficient or even suitable when high priority traffic with stringent latency requirements is using random access channels, particularly when a lot of such traffic is queued for transmission. Similar concerns can exist in other types of communications systems. Accordingly, current systems fail to support efficient, robust, reliable and flexible transmission services, particularly in shared bandwidth network environments, such as those utilizing such high capacity satellite systems.

For example, a prior known Aloha algorithm in a TDMA system typically has a long latency and underperformed throughput when the traffic load is high due to the method of self-detecting collision. In communications networks with long round trip time (RTT), the random access channel (for example, the Aloha channel) can also be used for transmitting data with stringent latency requirement, such as control message, real-time and interactive traffic. As an example, in the inroute (the direction from a remote terminal to the gateway) of the satellite network, the high priority traffic can be sent via random access channels to avoid large latency due to the delay of TDMA slot allocation. Because of the innate collision characteristics of a random access channel, when the throughput increases, the collision rate of random access channels also becomes higher, resulting in unwanted retransmissions which in turn bring increased latency in the transmission. A practical understanding is that when using Aloha type random access channels, there is a need for a desired throughput that corresponds to an acceptable operating collision rate.

In common practice, there exists a mechanism which backs off the transmission time once a collision happens. It has a drawback that a terminal starts to take preventive action (i.e., back-off) only after a collision. In addition, the back-off time increases as more collisions occur. Therefore, such a legacy approach may not be efficient or even suitable when high priority traffic with stringent latency requirements is using random access channels, particularly when a lot of such traffic is queued for transmission.

Thus, achieving efficient, robust, flexible and fast broadband services, in such a high capacity, shared bandwidth, satellite system network, however, poses unique challenges to system designers and operators to provide improved latency and throughput performance. In this regard, design challenges exist in ensuring that a remote node or terminal can efficiently identify in real time available transmission opportunities with a transmission probability capable of providing the required services for data transmission, and ensuring that load balancing is dynamically employed across one or more transmission channels for a plurality of remote terminals or nodes.

What is needed, therefore, is a system design that employs a dynamic and flexible architecture and method for determining a real time throughput of communications channels in a communications system and transmitting or providing such determined throughput to a plurality of terminals to enhance and provide efficient, robust, reliable and flexible services in a high capacity, shared network, such as in a high capacity, shared bandwidth, satellite network, and that would be relatively efficient and automated from a network management and load balancing standpoint. Further, a communications system that can reduce dependence on or can reduce or effectively eliminate the need for the terminal to detect collisions in a transmission channel by itself and thus improves the latency performance for transmission of traffic over a communications channel, such as random access channel according to an Aloha or diversity aloha protocol is also needed.

SOME EXEMPLARY EMBODIMENTS

The present invention advantageously addresses the needs above, as well as other needs, by providing a dynamic and flexible architecture and method for dynamically balancing loads in a communications system based upon a determined, real time throughput of one or more communications channels and generating and transmitting to remote nodes or terminals an operating probability based on the determined throughput for transmission using the communications channel, which meets various requirements and desires associated with efficient, robust, reliable and flexible broadband services in a high capacity, shared bandwidth, such as a satellite network, and that is relatively efficient and automated from a network management and load balancing standpoint.

According to an exemplary embodiment, a method comprises determining throughput of a communications channel in a communications system serving a plurality of terminals, generating an operating probability for the communications channel based on the determined throughput, and transmitting the generated operating probability to the plurality of terminals to control access of the communications channel by one or more of the terminals.

According to an exemplary embodiment, a method comprises determining throughput of a random access channel serving a plurality of terminals, generating an operating probability for the random access channel based on the determined throughput, and transmitting the generated operating probability to the plurality of terminals to control access of the random access channel by one or more of the terminals.

According to a further exemplary embodiment of the method, the access by the one or more terminals to the random access channel is according to an Aloha protocol or a diversity Aloha protocol using the generated operating probability.

According to a further exemplary embodiment, the method comprises determining an instant throughput of the communications channel, such as the random access channel, at a plurality of times over a predetermined time period, determining a moving average of the instant throughput over the predetermined time period, and generating the operating probability based on the moving average of the instant throughput for the predetermined time period.

According to another exemplary embodiment, the method comprises determining an upper limit and a lower limit of the operating probability for the communications channel, such as the random access channel, and generating the operating probability comprises adjusting an operating probability for the predetermined time period by one or more of the upper limit or the lower limit of the operating probability dependent upon the moving average of the instant throughput compared with a predetermined target throughput.

According to another exemplary embodiment, the method further comprises transmitting a threshold collision rate for the communications channel, such as the random access channel, to the plurality of terminals, and receiving a transmission request from one or more of the plurality of terminals based upon the generated transmitted operating probability adjusted by one or more of the upper limit or the lower limit of the operating probability or the threshold collision rate.

According to another exemplary embodiment, the method also comprises determining an updating period of a predetermined time to periodically update the generated operating probability, determining the throughput of the communications channel, such as the random access channel serving a plurality of terminals for each updating period, generating an operating probability for the communications channel, such as the random access channel, based on the determined throughput for each updating period, and transmitting the updated generated operating probability to the plurality of terminals to control access of the random access channel by one or more of the terminals.

According to further exemplary embodiments in the method, the communications system is one or more of a satellite communications system or a computer network.

According to further exemplary embodiments, the method comprises receiving at least at one terminal that communicates through the communications system an operating probability based on a determined throughput of a communications channel of the communications system, and determining by the at least one terminal a transmission probability for the communications channel based upon the received operating probability.

According to further exemplary embodiments, the method comprises receiving by the at least one terminal in a communications system an upper limit and a lower limit of the operating probability for a communications channel of the communications system, receiving by the at least one terminal a threshold collision rate for the communications channel, and determining by the at least one terminal a transmission probability for the communications channel based upon the received operating probability based on the determined throughput of the communications channel adjusted by one or more of the received upper limit of the operating probability, the received lower limit of the received operating probability or the received threshold collision rate.

According to another exemplary embodiment, an apparatus for controlling traffic load in a communications system comprises a controller for controlling traffic load in the communications system, the controller comprising a processor for performing operations and processing information for traffic load control in the communications system, a memory for storing information and instructions for execution by the processor, and a communications interface for communications of data or information to or from the controller, wherein the controller receives information on the traffic load of one or more communications channels of the communications system, processes the received traffic load information to determine a throughput of a communications channel, generates an operating probability for the communications channel based on the determined throughput, and determines to transmit the generated operating probability to a plurality of terminals that communicate over the communications channel to control access of the communications channel by one or more of the terminals.

In accordance with such an exemplary apparatus, the controller controls access by the one or more terminals to the communications channel according to an Aloha protocol or a diversity Aloha protocol. Further, the communications system can comprise a satellite communications system and the controller can comprise at least one an inroute group manager of one or more gateways in the satellite communications system, for example. Also, for example, the communications system can comprise a computer network system, and the controller can comprise one or more processors in the computer system.

According to further exemplary embodiments, the controller of the apparatus that controls access by the one or more terminals to the communications channel further determines an upper limit and a lower limit of an operating probability for the communications channels, such as a random access channel, based on received information on the traffic load, such as the throughput of the random access channel, determines a threshold collision rate for the random access channel based on received information on the traffic load for the random access channel, determines to transmit the upper limit and the lower limit of the operating probability to the plurality of terminals, and determines to transmit the threshold collision rate to the plurality of terminals.

According to further exemplary embodiments, the controller of the apparatus that controls access by the one or more terminals to the communications channel transmits the generated operating probability to the plurality of terminals, and receives a transmission request from one or more of the plurality of terminals based upon the generated transmitted operating probability.

Further, the controller that controls access by the one or more terminals to the communications channel can also transmit one or more of the upper limit of the operating probability, the lower limit of the operating probability or the threshold collision rate to the plurality of terminals, and receives a transmission request from one or more of the plurality of terminals based upon the generated transmitted operating probability adjusted by one or more of the upper limit of the operating portability, the lower limit of the operating probability or the threshold collision rate.

According to further exemplary embodiments, the controller that controls access by the one or more terminals to the communications channel also determines an updating period of a predetermined time to periodically update the generated operating probability, determines the throughput of the communications channel, such as the random access channel, serving a plurality of terminals for each updating period based on received information on the traffic load, such as the throughput of the random access channel, generates an operating probability for the random access channel based on the determined throughput for each updating period, and determines to transmit the updated generated operating probability to the plurality of terminals to control access of the communications channel, such as the random access channel, by one or more of the terminals.

According to a further exemplary embodiment, an apparatus for controlling traffic load in a communications system comprises a controller for a remote terminal in the communications system, the controller comprising a processor for performing operations and processing information for determining transmission of data over a communications channel in the communications system, a memory for storing information and instructions for execution by the processor, and a communications interface for communications of data or information to or from the controller, wherein the controller receives from the communications system an operating probability for the communications channel generated based on a determined throughput of the communications channel of the communications system, and determines a transmission probability for transmission of data on the communications channel based upon the received generated operating probability.

According to further exemplary embodiments, the controller for the remote terminal is in a communications system that comprises a satellite communications system, and the communications channel comprises a random access channel, such as an Aloha channel. The controller for the remote terminal can also be in a communications system that comprises a computer communications network, for example.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 6A-6C depict flow charts illustrating algorithms for dynamic load balancing using a generated operating probability based on throughput, in accordance with exemplary embodiments;

FIGS. 8A-8E depict flow charts illustrating algorithms for dynamic load balancing implemented at a remote terminal or remote node in a communications system, for determining a transmission probability at transmission opportunities using the received generated operating probability based on throughput, as can be applied with the exemplary algorithms of FIGS. 6A-6C and 7, in accordance with exemplary embodiments;

DETAILED DESCRIPTION

Figure 1A:
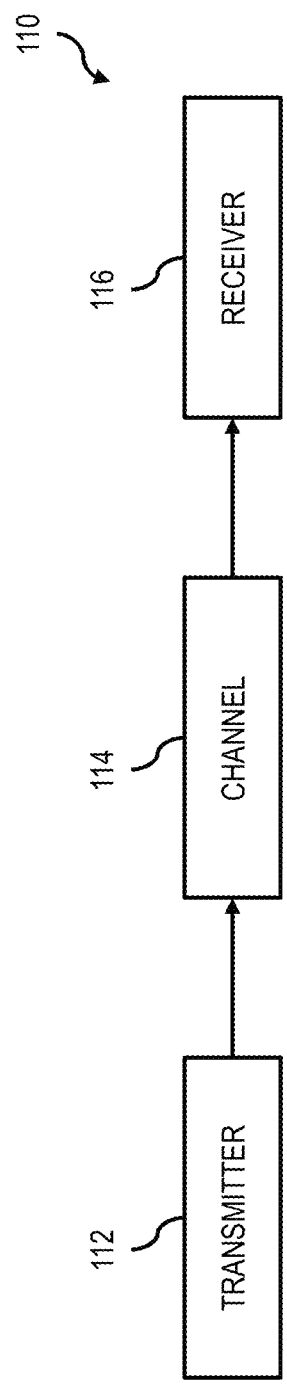
FIGS. 1A, 1B and 1C illustrate communications systems capable of employing an apparatus and methods for load balancing of traffic loads transmitted from remote terminals or remote nodes, in accordance with various exemplary embodiments.

In accordance with an aspect of the present invention, dynamic and flexible architectures and methods are provided for dynamic load balancing using a generated operating probability based on a determined throughput of a communications channel, such as a random access channel, which meet various requirements and desires associated with efficient, robust, reliable and flexible broadband services in a high capacity, shared bandwidth, communications network, such as a satellite communications network or a computer network, and that is relatively efficient and automated from a network management and load balancing standpoint. According to a further aspect, a method and apparatus is provided to control collision rates via control of the throughput, as it is difficult for a gateway of such a communications network to measure the collision rate, and a higher collision rate results in higher latency. The gateway is able to measure the throughput of a channel, where the channel has certain collision characteristics, and there exists known mappings between the throughput and collision rate for certain collision channels. The collision rates are thereby controlled via a controlling (e.g., balancing) the throughput. Controlling the throughput can be achieved by sending an operating probability to all terminals of the network, where the terminals apply such probability in transmitting packets via the collision channel. Accordingly, by adjusting the broadcast operating probability, the gateway can control the throughput to a targeted level, and thus the targeted collision rate, and ultimately the targeted latency.

In such a shared bandwidth network, for example, where multiple remote nodes or remote terminals access broadband services through one or more aggregation nodes (e.g., gateways), according to various exemplary embodiments, the present architecture and method for load balancing by association of remote nodes with respective aggregation nodes for data transmission based on the received generated operating probability of a communications channel satisfies various requirements and desires related to the provision of efficient, robust, reliable and flexible broadband services. For example, in accordance with an exemplary embodiment, based on the services for which a remote node (e.g., a user terminal or node) is configured (e.g., the services to which a user of the terminal has subscribed), the terminal utilizes one or more quantitative service criteria for selecting a pool of aggregation nodes that meet such service criteria. In other words, a terminal selects an aggregation node from an eligible pool of aggregation nodes or gateways that support service configurations and subscriptions that satisfy the service requirements of the terminal, such as for data transmission of traffic load. A terminal associates with an aggregation node by selecting a particular node (from a pool of suitable aggregation nodes available to the terminal) for provision of the required services to the terminal. Once the terminal completes an association process according to exemplary protocols of embodiments of the present invention, and the aggregation node accepts the association, the terminal becomes associated with the selected aggregation node.

Further, the exemplary methods and apparatus for aspects of the invention are applicable to pooled redundancy and dynamic load balancing. According to an exemplary embodiment, terminals can load balance as they enter the system based upon a received generated operating probability, and can also load balance dynamically during operation of the system through periodic, updated operating probabilities of various communications channels received from gateways or aggregation nodes. Terminals can overcome aggregation node failures by load balancing across other active aggregation nodes of the same pool, which would save the requirement for one-to-one hot redundancy for recovering from hardware failures, receiving generated operating probabilities received from such active aggregation notes or gateways on which to base transmission probability. Terminals can also dynamically transition to a diverse gateway, for example, when a gateway or communications link failure requires a transition to a secondary gateway (which, for example, can be a redundant gateway or an operational gateway at a diverse site) and base transmission probability upon received generated operating probability from such diverse gateway.

In accordance with an exemplary embodiment, such a shared bandwidth network for data transmission can comprise a broadband satellite communications system, where multiple remote nodes (e.g., satellite terminals (STs)) access broadband services through one or more aggregation nodes (e.g., gateways (GWs) or IP gateways (IPGWs). Another example is a computer network for data transmission over communications channels from remote terminals that communicate data over such communications channels.

Figure 1B:
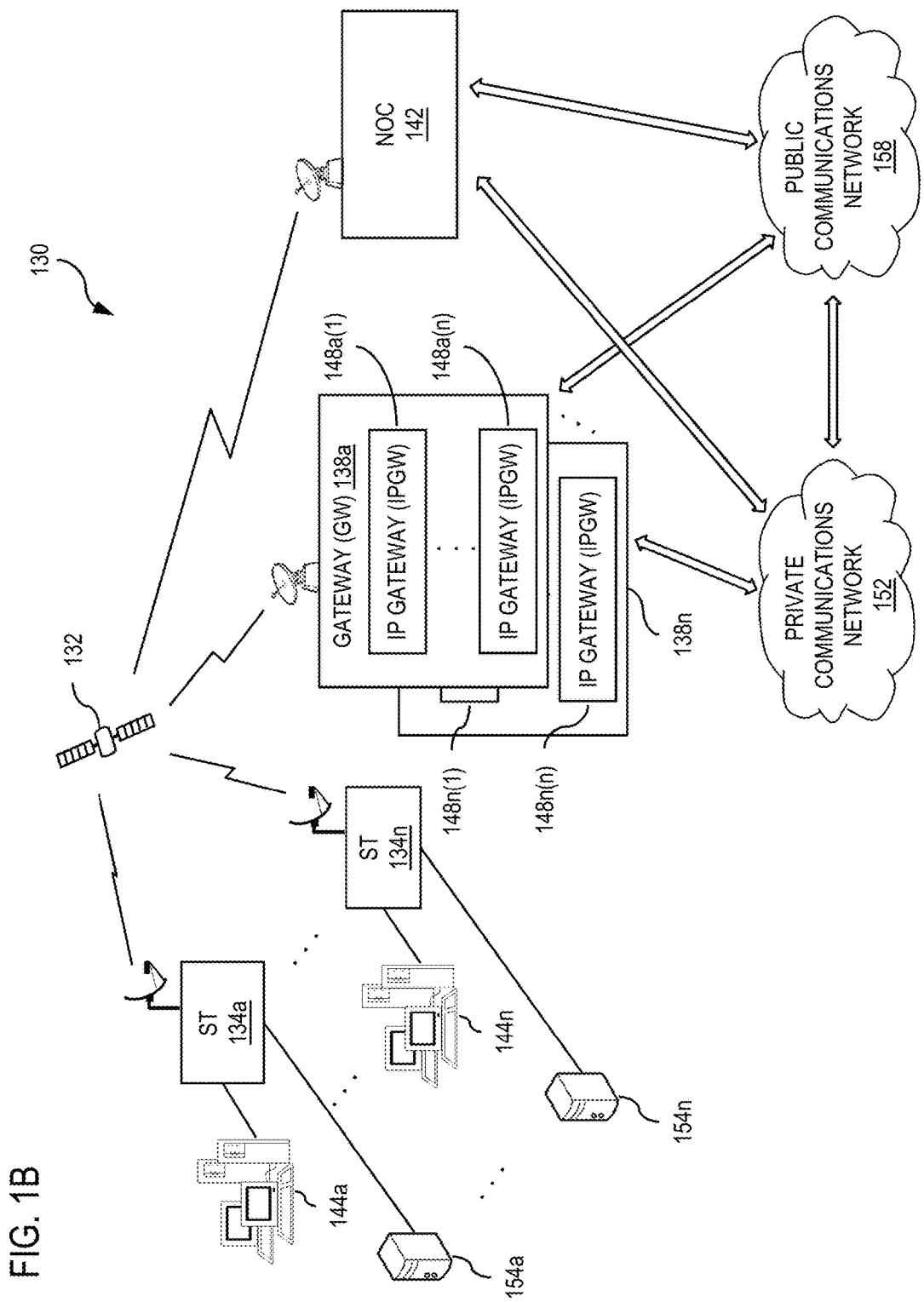
Figure 1C:
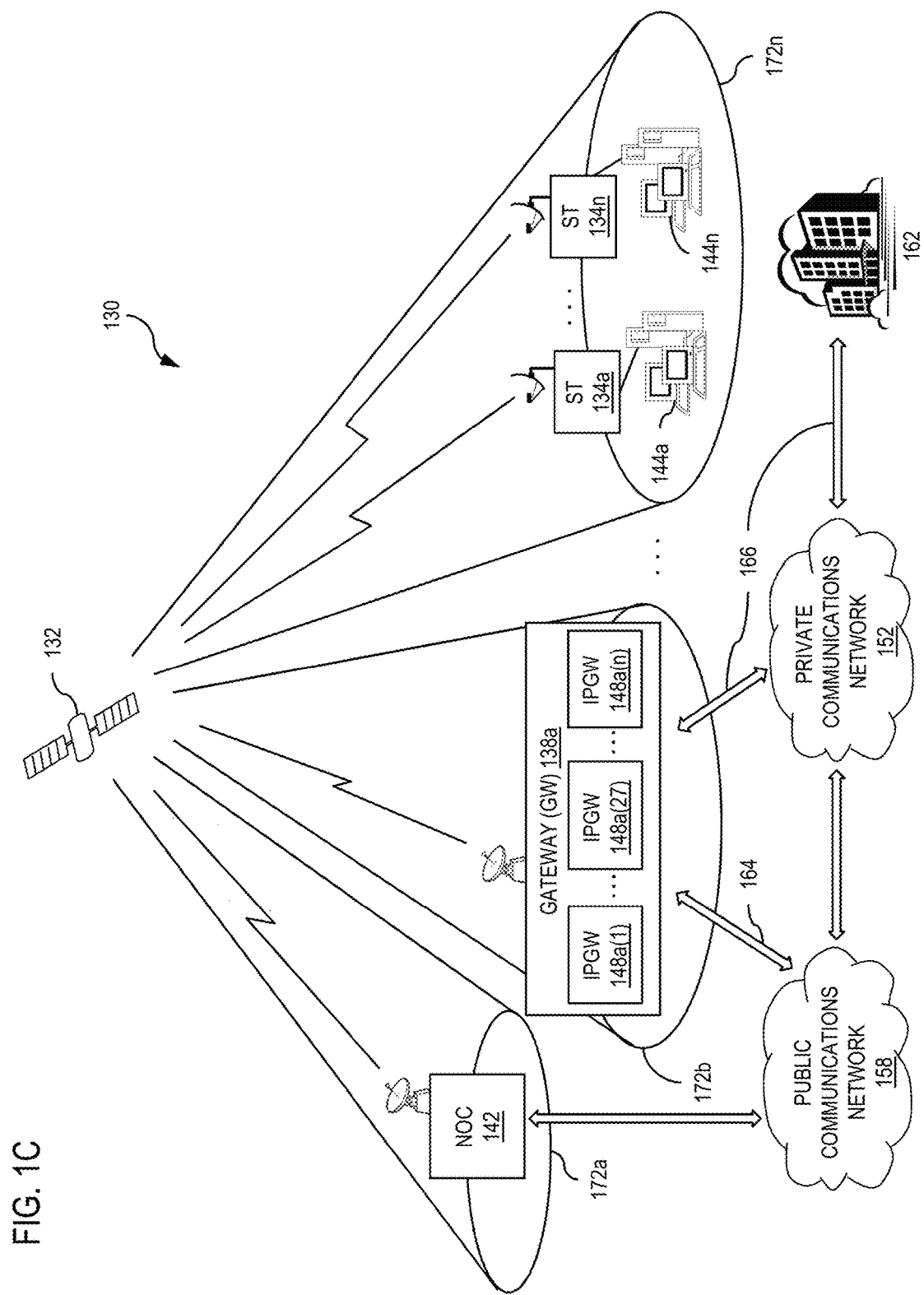

FIGS. 1A-1C illustrate exemplary communications systems capable of employing a dynamic and flexible architecture and methods for dynamic load balancing using generated operating probabilities for communications channels based on determined throughput of the communications channels according to aspects of the invention. With reference to FIG. 1A, a digital communications system 110 includes one or more transmitters 112 (of which one is shown) that generate signal waveforms across a communications channel 114 to one or more receivers 116 (of which one is shown). In this discrete communications system 110, the transmitter 112 has a signal source that produces a discrete set of data signals, where each of the data signals has a corresponding signal waveform. These signal waveforms are attenuated, or otherwise altered, by communications channel 114. To combat noise and other issues associated with the channel 114, coding can be utilized. For example, forward error correction (FEC) codes can be employed.

FIG. 1B illustrates an exemplary satellite communications system 130, as an example of a communications system, capable of supporting communications among terminals with varied capabilities, that support and implement aspects of the invention, according to exemplary embodiments for dynamic load balancing. Satellite communications system 130 includes a satellite 132 that supports communications among multiple satellite terminals (STs) 134a-134n, a number of gateways (GWs) 138a-138n, and a network operations center (NOC) 142. The NOC 142 performs the management plane functions of the system 130, while the GWs 138a-138n perform the data plane functions of the system 130. For example, the NOC 142 can perform such functions as network management and configuration, software downloads (e.g., to the STs 134a-134n), status monitoring, statistics functions (e.g., collection, aggregation and reporting), security functions (e.g., key generation, management and distribution), ST registration and authentication, and GW diversity management. The NOC 142 can communicate with each GW via the satellite 132, or via a secure private communications network 152 (e.g., an IPsec tunnel over a dedicated link or a virtual private network (VPN) or IPsec tunnel through a public network, such as the Internet). Additionally, each GW and the NOC can have connectivity to one or more public communications networks 158, such as the Internet or a PSTN.

According to a further exemplary embodiment, each of the GWs 138a-138n can include one or more gateways (IPGWs)—whereby the data plane functions are divided between a GW and its respective IPGWs. For example, GW 138a can include IPGWs 148a(1)-148a(n) and GW 138n can include IPGWs 148n(1)-148n(n). A GW can perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement. Whereas, the IPGW can perform such functions as data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. Further, a GW and respective IPGW can be collocated with the NOC 142. The STs 134a-134n can provide connectivity to one or more hosts 144a-144n and/or routers 154a-154n, respectively. The satellite communications system 130 can operate as a bent-pipe system, where the satellite essentially operates as a repeater or bent pipe. Alternatively, the system 130 can employ a switching or processing satellite supporting mesh communications (point-to-point communications directly between, for example, the two STs 134a and 134n).

In a communications system 130 that employs a processing satellite (e.g., including a packet switch operating, for example, at a data link layer), the system can support direct unicast (point-to-point) communications and multicast communications among the STs 134a-134n and GWs 138a-138n. In the case of a processing satellite, the satellite 132 decodes the received signal and determines the destination ST or STs and/or GWs. The satellite 132 then addresses the data accordingly, encodes and modulates it, and transmits the modulated signal to the destination ST or STs (e.g., ST 134n) and/or GWs (and their respective IPGWs). According to exemplary embodiments, the system 130 thereby provides a fully meshed architecture, whereby the STs 134a-134n can directly communicate, via a single hop, over the satellite 132.

In a bent-pipe system of an exemplary embodiment, the satellite 132 operates as a repeater or bent pipe, and communications to and from the STs 134a-134n are transmitted over the satellite 132 to and from respective IPGWs associated with particular STs. Further, in a spot beam system, any one spot beam (e.g., FIG. 1C, beams 172a-172n) operates as a bent-pipe to geographic region covered by the beam. For example, each spot beam operates as a bent pipe communications channel to and from the STs and/or IPGW(s) within the geographic region covered by the beam. According to one embodiment, several GWs/IPGWs are distributed across the geographic region covered by all spot beams of the satellite 132, where, in a beam in which a GW (and respective IPGWs) are located, only the one GW (and no STs) occupies that beam. Further, each IPGW can serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the STs), locations of available terrestrial data centers (e.g., terrestrial data trunks for access to public and private dedicated networks).

More specifically, with reference to FIG. 1C, for example, for a data communications from ST 134a to a public communications network 158 (e.g., the Internet), the ST 134a can be associated with an IPGW (e.g., IPGW 148a(1)—selected from a pool of IPGWs available to the ST 134a, such as IPGWs 148a(1)-148a(27)—where the pool of IPGWs is a suitable subset of the IPGWs 148a(1)-148a(n) located at the GW 138a). The data is first transmitted, via the satellite 132, from the ST 134a to associated IPGW 148a(1). The data transmission can be based, at least in part, on dynamic load balancing based upon a generated operating probability received by an ST based on a determined throughput of a communications channel, transmitted from a GW, such as from a GW Inroute Group Manager (IGM), such as for an IPGW, according to aspects of the invention, to promote optimization of load balancing in the communications channels serviced by the GWs. The IPGW 148a(1) determines the destination as being the Internet 158. The IPGW then repackages the data (e.g., as a TCP/IP communications), and routes the data communications, via the terrestrial link 164, to the Internet 158. Further, in a corporate network, for example, a corporation can deploy various remote STs at remote offices. More specifically, ST 134n, located at a remote corporate location, can desire to securely communicate with the corporate headquarters 162. Accordingly, for a data communications from ST 134n to the corporate headquarters 162, the data is first transmitted, via the satellite 132, from the ST 134n to an IPGW associated with the ST 134n (e.g., IPGW 148a(27)). The IPGW 148a (27) determines the destination as being the corporate headquarters 162. The IPGW then repackages the data (e.g., as an IPsec communications), and routes the IPsec data communications, via the secure terrestrial links 166 (over the private network 152), to the corporate headquarters 162. In the corporate network scenario, a further example can involve a corporate communications from the corporate headquarters to a number of remote sites (e.g., a multicast communications to STs 134a-134n)—where STs 134a-134n are correspondingly associated with the two IPGWs 148a(1) and 148a(27) (e.g., grouped between the two IPGWs based on load balancing and IPGW capabilities). In this scenario, a gateway or router, within the local network of corporate headquarters 162, transmits the data communications, via the secure terrestrial links 166 (over the private network 152), to the IPGWs 148a(1) and 148a(27). The IPGWs determine that the communications is destined for the remote STs 134a-134n, and package the data as a multicast communications addressed to the community of STs 134a-134n. The IPGWs then transmit the data communications, via the satellite 132, for decoding by the community of STs 134a-134n. Accordingly, the satellite of such a system acts as a bent pipe or repeater, transmitting communications between the STs 134a-134n and their respective associated IPGWs 148a-148n.

Moreover, according to various exemplary embodiments and aspects of the invention, STs would be capable of performing dynamic load balancing at various different levels based upon the transmitted generated operating probabilities based on the determined throughput of the communications channels, such as from controllers associated with the respective GWs. For example, STs can perform load balancing according to aspects of the invention across multiple outroutes of multiple IPGWs (either within a single satellite beam or across geographically diverse IPGWs), where the messaging to and from the various IPGWs is directed by the satellite to the beam(s) within which the STs are located, and on channels that the STs are capable of accessing.

Thus, to promote a desired collision rate and throughput, metrics are sent to the terminal that allows the terminal to employ a traffic control policy to govern the traffic using Aloha channels. For the purpose of convenience, random access channel and Aloha channel are exchangeably used in the context, and should not be construed in a limiting sense. Also, the traffic control policy can vary as follows as a function of the metrics and its configuration.

Therefore, the IPGW, associated with a GW, periodically transmits its capabilities multicast message (CMM), such message can include the generated operating probability of the communications channels it services for data transmission based upon the throughput of the communications channels, according to aspects of the invention. The CMM indicates the loading, service capabilities, and current state of the IPGW. The CMM is multicast from each IPGW to every terminal in the outroute stream on which the IPGWs traffic is transmitted. Each IPGW periodically multicasts the CMM, provided that the IPGW has a service signature key, is in a service state (e.g., not in a maintenance state), and has a configuration related to capabilities. While each IPGW sends the CMM out at a similar periodicity, the periodicity is configurable, and synchronization is not required across IPGWs as to when they actually send the CMM. Under certain conditions, an IPGW can send the CMM, containing the generated operating probability of communications channels, more frequently than the standard periodicity.

In accordance with a further aspect of the invention, the CMM can include information reflecting the web acceleration servers available through the respective IPGW, along with current load information for each of the servers and the operating probability of the communications channels serviced by the servers. In such a case, the STs can further load balance across the web acceleration servers by associating with an IPGW that would provide access to a suitable web acceleration server that is not overloaded, based upon the transmitted generated operating probability based on the determined throughput of the communications channels according to aspects of the invention. The CMM can further contain an indication of supported web acceleration servers and loading, which would provide a list of web acceleration servers supported by the IPGW, along with a loading metric for each server that is used when selecting a web acceleration server, such loading metric, such as in a computer network, can also include a generated operating probability of communications channels in the computer network, based upon the determined throughput of the communications channels, again according to aspects of the invention.

Figure 10:
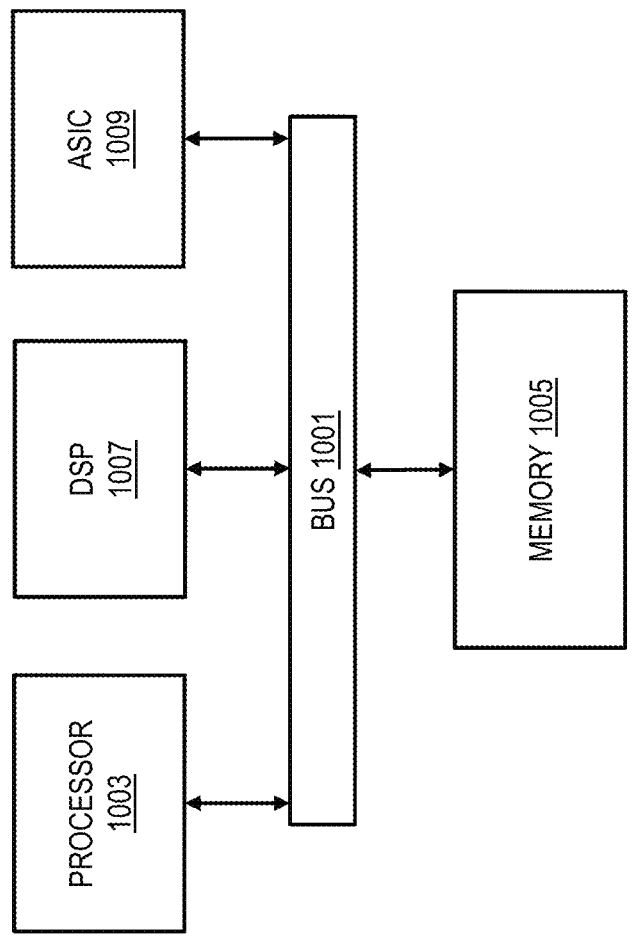
FIG. 10 is a diagram of a chip set that can be utilized in implementing architectures, apparatus and methods for dynamic load balancing of traffic loads transmitted from remote terminals or remote nodes, according to exemplary embodiments.

The architectures and methods for dynamic load balancing, according to aspects of the invention, based upon a transmitted generated operating probability that is based upon a determined throughput of a communications channel (such as a random access channel), according to exemplary embodiments of the present invention, can be implemented, at least in part, by one or more chip sets, including one or more controllers with processors and memory, as illustrated in FIG. 10 (showing one such controller processor). The chip set 1000 can be incorporated into the remote terminals, such as STs, and/or in GWs/IPGWs, or in remote terminals and/or controllers/servers of computer networks and systems, according to aspects of the invention. As such, the chip set 1000 provides a means for accomplishing various parts of the algorithms and protocols herein described and illustrated. Further, different aspects of such algorithms and protocols can be allocated to the components of the chip set, as would be prudent based on design choices that would be apparent to one of skill in the art. Further, access to such a random access channel may be according to any TDM-based random access protocol, such as Aloha and diversity Aloha protocols (e.g., in a satellite network or computer network communications system).

As illustrated by the exemplary embodiments, an innovative methods and apparatus to control the traffic volume that accesses the Aloha channels is presented by way of example. However, the apparatus and methods illustrating innovative aspects of the exemplary embodiments have a broader applicability to other types of communications channels and communications systems, such as in other satellite network and computer network communications systems; and, therefore, applicability of such methods and apparatus should not be construed in a limiting sense. With this approach, and, therefore, by way of example, an operating probability is derived by an Inroute Group Manager (IGM) at the gateway station based on the throughput of the random access channels. Such probability is applied to govern the terminal's usage of Aloha access channel, for example. When the throughput is high, the operating probability in transmitting a packet will be low; otherwise, it should be high. The parameters, according to aspects of invention, can be quantized based on the way a data burst is transmitted, i.e., via regular or diversity Aloha, for example.

An advantageous aspect of the invention, as demonstrated by the exemplary embodiments, is that a significant reduction in the need for the terminal to detect the collision by itself is provided, which promotes a significant improvement in the latency performance for Aloha traffic, or for traffic on communications channels, in general. Further advantageous and innovative aspects, include, for example, a controller in a communications system, such as a satellite gateway, broadcasts an operating probability, based on a determined throughput of respective communications channels, to remote terminals or nodes to govern the load in Aloha channels; and, as a result of such transmission, multiple innovative methods and apparatus are likewise provided to react to the changing loading metrics reported by the communications network, such as can be implemented at the remote terminals based upon the transmitted, generated operating probability.

Figure 2:
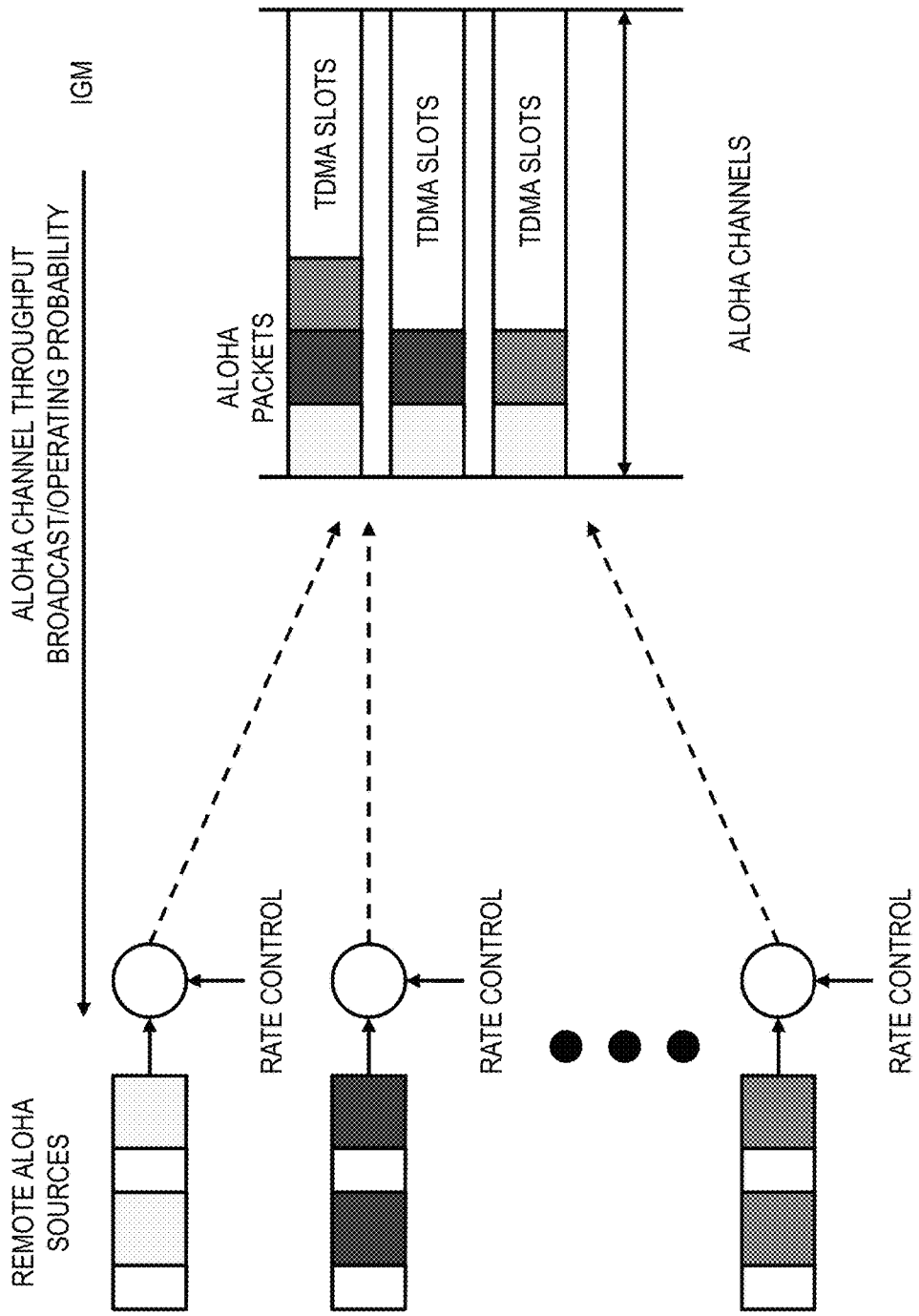
FIG. 2 depicts a flow control model for traffic flow in Aloha Channels, in accordance with an exemplary embodiments.

An exemplary flow control model in Aloha channels is depicted in FIG. 2, in accordance with exemplary embodiments. As shown therein, traffic data that is intended to use Aloha channels is queued at each remote terminal before transmission. As depicted in FIG. 2, the operating probability generated from the determined throughput of the Aloha channel is provided from a controller in the communications system, i.e., an Inroute Group Manager (IGM) for one or more gateways to the remote terminals, nodes or sources, according to aspects of the invention. As illustrated in FIG. 2, the queued data at the remote terminals, sources or nodes can be transmitted either via Aloha or TDMA slot allocation, in exemplary embodiments, for example.

With reference to FIG. 2, the inventive aspects of transmitting by the controller of a communications system the generated operating probability of respective communications channels, such as the Aloha channel, address problems in data transmission, such as typically occur resulting from traffic allowed to use Aloha channels when the transmission opportunity comes. One such problem addressed, for example, is that for TDMA based Aloha channels, a collision happens when two data bursts arrive at the same time slot, with the result that none of them can be decoded successfully.

Figure 3:
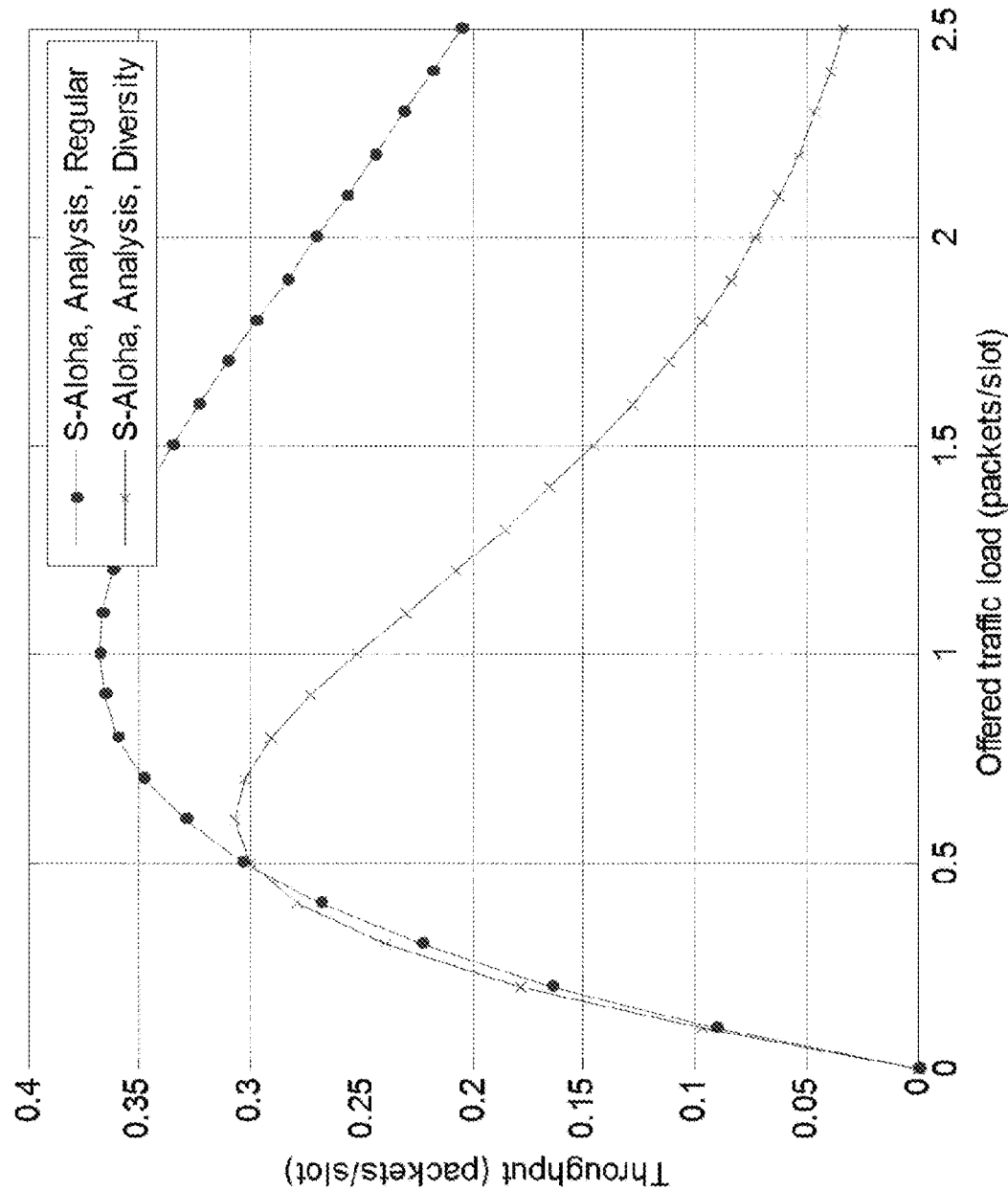
FIG. 3 depicts a graph of system throughput as a function of offered load in Aloha channels, in accordance with exemplary embodiments.

FIG. 3 depicts a graph of system throughput as a function of offered load in Aloha channels to which the methods and apparatus of load balancing apply to exemplary embodiments. In the described exemplary embodiments, with reference to FIG. 3, system throughput, such as in an Aloha channel, is defined as the ratio of the number of successful Aloha bursts and the total Aloha burst opportunities in a certain amount of time, or more generally defined as the number of successful bursts (transmissions) and the total burst (transmission) opportunities in a certain amount of time. Also, the offered load refers to the ratio of total amount of data bursts (same size as Aloha burst) and the total Aloha opportunities in a certain amount of time, or more generally, as the ratio of total amount of data bursts (transmissions) and the total transmission opportunities in a certain amount of time.

As illustrated in FIG. 3, the system throughput for a communications system can be expressed as a function of the offered traffic load assuming a certain traffic arrival distribution, such as shown in FIG. 3, for example, where the regular and diversity Aloha performance is demonstrated based on Poisson arrivals. Diversity Aloha refers to a method where one Aloha packet is sent twice in consecutive or not largely separated transmission opportunities. It can be seen that the throughput increases until the offered load reaches certain thresholds. For example, when offered load equals to 1, the throughput of regular Aloha peaks at 0.36. The throughput of Diversity Aloha peaks at 0.31. When the offered load is about in between 0 to 0.5, the diversity Aloha typically outperforms the regular Aloha.

Figure 4:
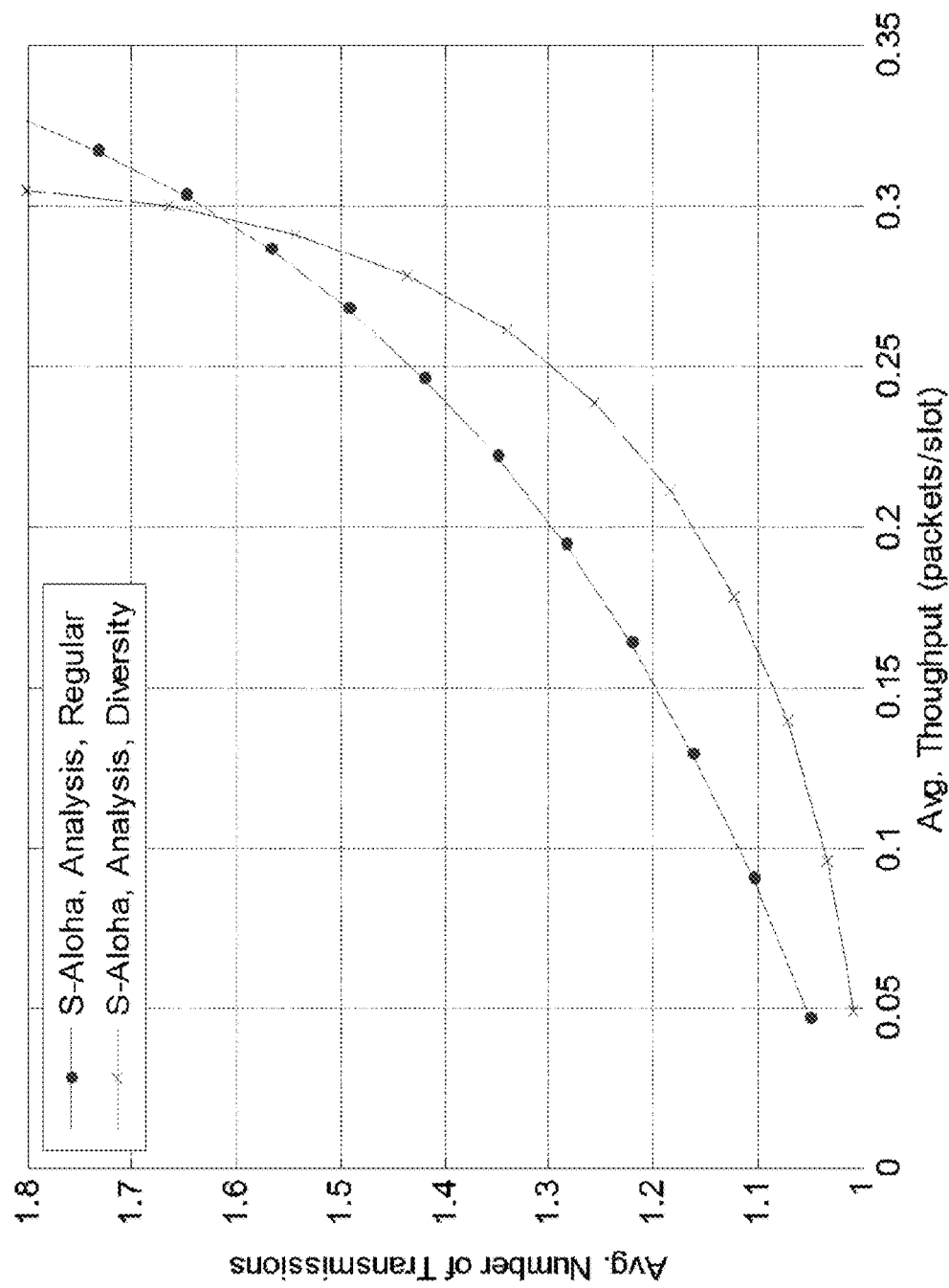
FIG. 4 depicts a graph of an average number of Aloha transmissions as a function of average throughput, in accordance with exemplary embodiments.

FIG. 4 depicts a graph of an average number of Aloha transmissions as a function of average throughput to which the methods and apparatus of load balancing apply to exemplary embodiments. FIG. 4 demonstrates the average number of transmissions of an Aloha burst as a function of average throughput. It can also be translated as the relationship in terms of burst latency vs. the system throughput. Given the target latency, the system throughput can be traded off within a limit. As the throughput increases, the needed number of transmissions goes up exponentially, and so does the latency. For the two cases illustrated in FIG. 4, for example, the diversity Aloha outperforms the regular Aloha in terms of latency when throughput is less than around 0.29, where the two curves intersect. The following are some observations of interest in relation to load balancing, according to aspects of the invention, from the information depicted in FIG. 4:

(1) for 90% of latency within one half RTT (i.e., no retransmission), diversity Aloha has 16+% throughput vs. approximately 9% for regular Aloha; and
(2) for 95% of latency within one half RTT (i.e., no retransmission), diversity Aloha has 12+% throughput vs. approximately. only 5% for regular Aloha.

Figure 5:
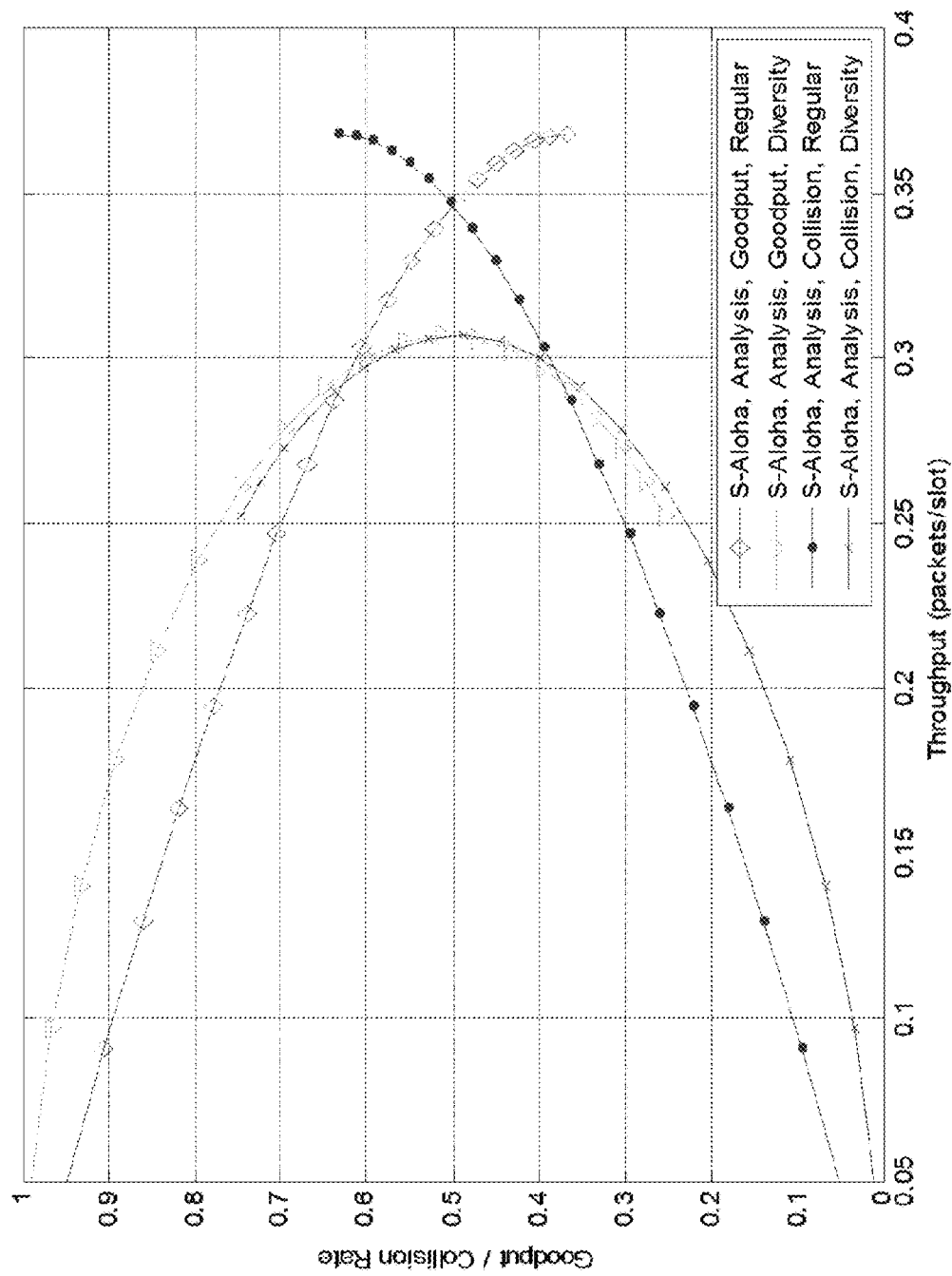
FIG. 5 depicts a graph of system goodput as a function of throughput or offered load in Aloha channels, in accordance with exemplary embodiments.

FIG. 5 depicts a graph of system goodput as a function of throughput or offered load in Aloha channels to which the methods and apparatus of load balancing can apply to exemplary embodiments. The system goodput, which is defined as the ratio of the number of successfully received bursts (at the first transmission) and the total number of transmitted bursts, can also be observed as a function of the throughput or the offered load, as shown in FIG. 5. It is observed that the goodput decreases as the throughput increase, implying more collisions. The collision rate (defined as 1—goodput) is also shown in FIG. 5.

Therefore, from FIGS. 2-5, it can be concluded that in order to achieve a latency or goodput target and to avoid excessive collision rate, the system throughput can be measured and controlled in a desired range, respectively for regular and diversity Aloha, and, by extension, to other communications channels, by regulating the offered traffic load. However, because the offered load is a function of total number of active terminals and the transmission rate at each terminal, it can be difficult to know whether a terminal is active or not at a certain time.

Therefore, it can be advantageous to control the average transmission rate at each terminal to achieve the desired offered load. The methods and apparatus of the invention provide innovative aspects for improving such control by transmitting a generated operating probability of respective communications channels, based on their respective determined throughput, to remote terminals or nodes in a communications system. The remote terminals, nodes or sources can use the transmitted generating operating probability at transmission opportunities to determine a realistic transmission probability for transmission of data or information over communications channels, such as Aloha channels, that can minimize latency and improve the goodput for the transmissions.

Methods and apparatus of the invention, and aspects of the invention, by reference to the exemplary embodiments, are described with reference to FIGS. 6A-8E, in relation to Aloha transmission rate control in Aloha channels, by way of example, although the aspects of the invention are not limited to only Aloha channels, but apply broadly to communications channels in other communications networks, such as satellite networks and computer networks, or combinations thereof. Also, the order of the process steps can vary, as well as the inclusion, omission or repetition of various steps can vary, and thus the exemplary embodiments and aspects of the invention should not be construed in a limiting sense.

Figure 6B:
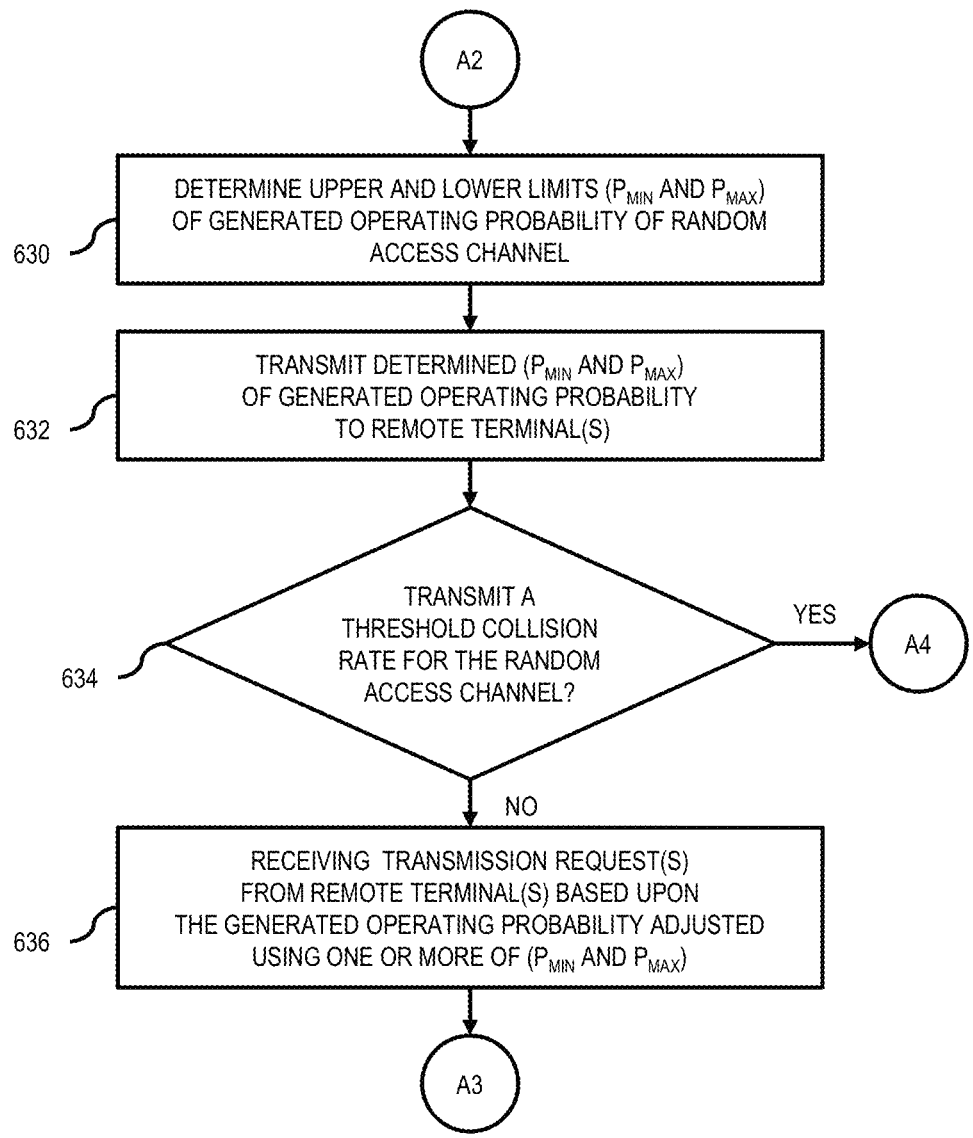
Figure 6C:
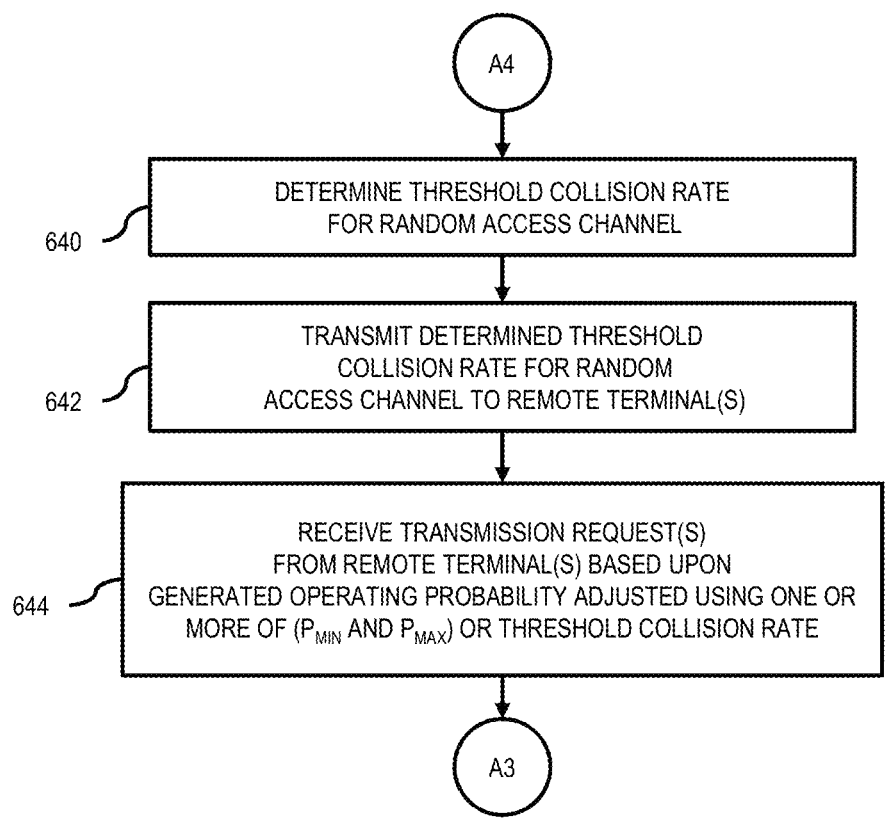

FIGS. 6A-6C depict flow charts illustrating algorithms for dynamic load balancing using a generated operating probability based on determined throughput of Aloha channels in a satellite communications system, as examples of applications of the methods and apparatus in communications systems, in accordance with exemplary embodiments.

Referring to FIGS. 6A-6C, at Step 602 at a gateway, such as by an inroute IGM, as an example of a controller that controls access by the one or more terminals to the communications channel, the throughput of Aloha channels, such as random access channels, is measured over time. At Step 603, the measured throughput is then compared with a pre-defined target throughput. The IGM also manages an operating probability that each terminal would follow. At Step 604, an operating probability is generated for the random access channel based upon the comparison of the determined throughput and the predetermined, or pre-defined, throughput. When the measured throughput is higher than the target, the operating probability is reduced; otherwise, it is increased.

At Step 606, the controller determines whether the generated operating probability is current. If not the process returns to Step 602. If current, at Step 608, the controller, such as the IGM, determines to transmit the generated operating probability of the random access channel, such as an Aloha channel, to remote terminals. At Step 610, such derived, or determined, operating probability is broadcast, i.e., transmitted, periodically to all terminals in order to govern the offered load. Each terminal typically can apply the received operating probability to each Aloha transmission opportunity. The terminal can apply a sanity check based on the collision rate for the random access channel to validate the received operating probability.

The controller, such as the IGM of one or more gateways, can also broadcast the upper and lower limits of the operating probability, $P_{min}$ and $P_{max}$, as well as a default threshold for the collision rate to the remote terminals, which can be used by the terminals to adjust the generated operating probability, as can be used to determine the transmission probability for transmission of data and information by the remote terminals, based upon various factors, such as the load to be transmitted, the load's priority or the type of load, as will be discussed further with respect to exemplary embodiments.

In this regard, at Step 612, the controller, such as an IGM of one or more gateways, decides whether to transmit the upper and lower limits of the operating probability, $P_{min}$ and $P_{max}$, to the remote terminals. If not, the process proceeds to Step 614 where the controller, such as the IGM, receives a transmission request for one or more remote terminals based upon the generated transmitted operating probability, and then, at Step 616, receives data from one or more of the remote terminals for transmission over the communications channel, such as the random access or Aloha channel; and then, at Step 618, transmits the received data over the communications channel corresponding to the transmitted generated operating probability, where the process ends. The process, however, can return to Step 602 to repeat the process as to determining a current generated operating probability, such as at predetermined times.

However, at Step 612, if the controller, such as an IGM, determines to transmit the upper and lower limits of the operating probability, $P_{min}$ and $P_{max}$, to the remote terminals, the process proceeds to Step 630 where the controller determines the upper and lower limits of the operating probability, $P_{min}$ and $P_{max}$, of the one or more communications channels, such as the random access channels. Then at Step 632, the controller, such as an IGM, transmits the determined upper and lower limits of the generated operating probability, $P_{min}$ and $P_{max}$, to the remote terminals.

Then at Step 634, the controller, such as an IGM, determines whether to transmit a threshold collision rate for the communications channel, such as the random access channel, to the remote terminals. If not, the process proceeds to Step 636 where the controller, such as the IGM, receives a transmission request for one or more remote terminals based upon the generated transmitted operating probability, which can be adjusted using one or more of the upper and lower limits of the operating probability, $P_{min}$ and $P_{max}$, such as, for example, when different rate plans with different load priorities are involved for transmission. The process then proceeds to return to Step 616, where the controller receives data from one or more of the remote terminals for transmission over the communications channel, such as the random access or Aloha channel; and then, at Step 618, transmits the received data over the communications channel corresponding to the transmitted generated operating probability, where the process ends. The process, however, can return to Step 602 to repeat the process as to determining a current generated operating probability, such as at predetermined times.

However, at Step 634, if the controller, such as an IGM, determines to transmit the threshold collision rate for one or more communications channels to the remote terminals, the process proceeds to Step 640 where the controller determines the threshold collision rate of the one or more communications channels, such as the random access channels. Then at Step 642, the controller, such as an IGM, transmits the determined threshold collision to the remote terminals. The process then proceeds to Step 644 where the controller, such as the IGM, receives a transmission request for one or more remote terminals based upon the generated transmitted operating probability, which can be adjusted using one or more of the upper limit of the operating probability ($P_{max}$), the lower limit of the operating probability ($P_{min}$) or the threshold collision rate, such as, for example, when different rate plans with different load priorities are involved for transmission. The process then proceeds to return to Step 616, where the controller receives data from one or more of the remote terminals for transmission over the communications channel, such as the random access or Aloha channel; and then, at Step 618, transmits the received data over the communications channel corresponding to the transmitted generated operating probability, where the process ends. The process, however, can return to Step 602 to repeat the process as to determining a current generated operating probability, such as at predetermined times.

Figure 7:
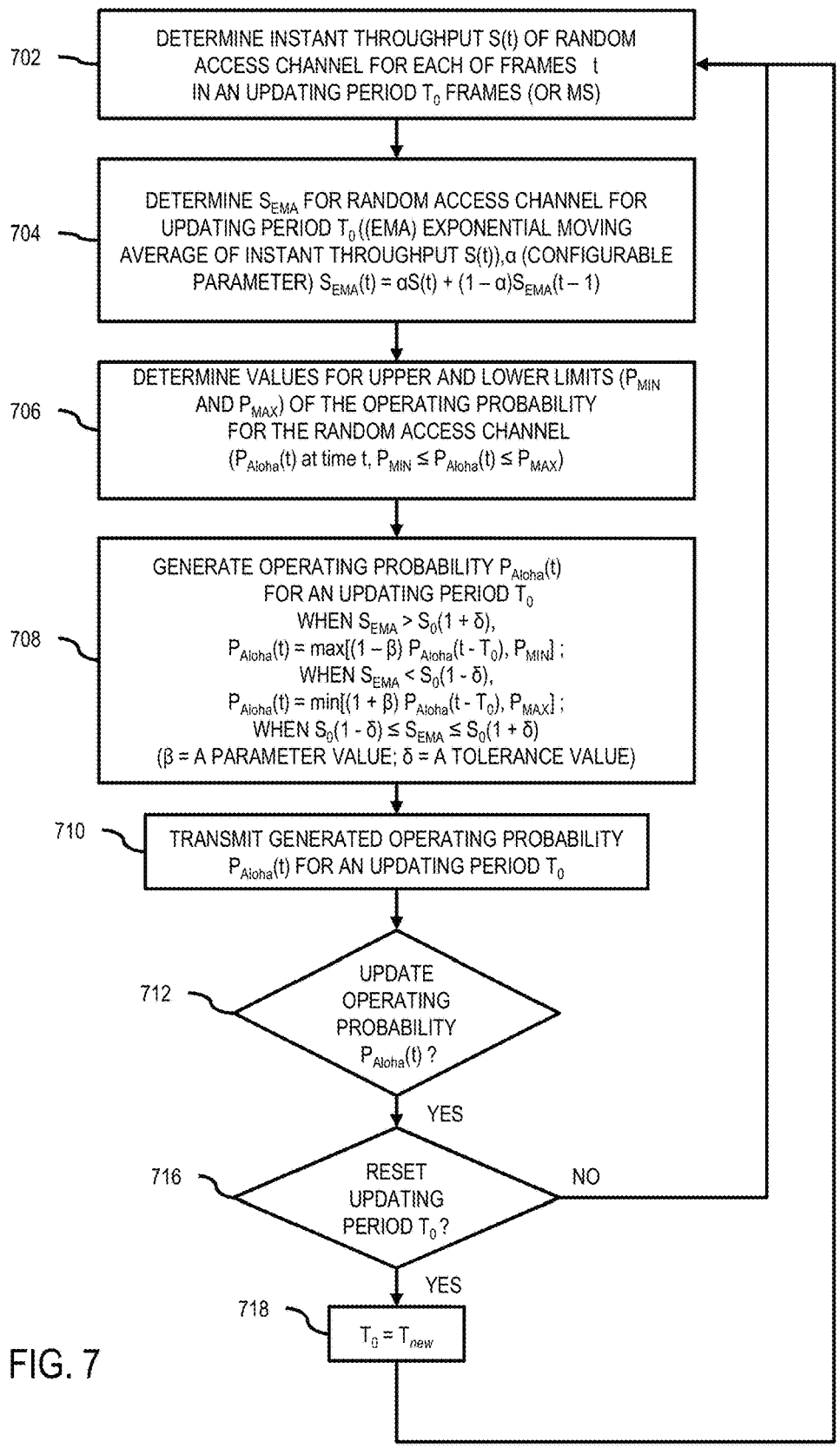
FIG. 7 depicts a flow chart illustrating an algorithm for dynamic load balancing using a generated operating probability based on throughput, as can be applied with the exemplary algorithms of FIGS. 6A-6C, in accordance with exemplary embodiments.
Figure 8A:
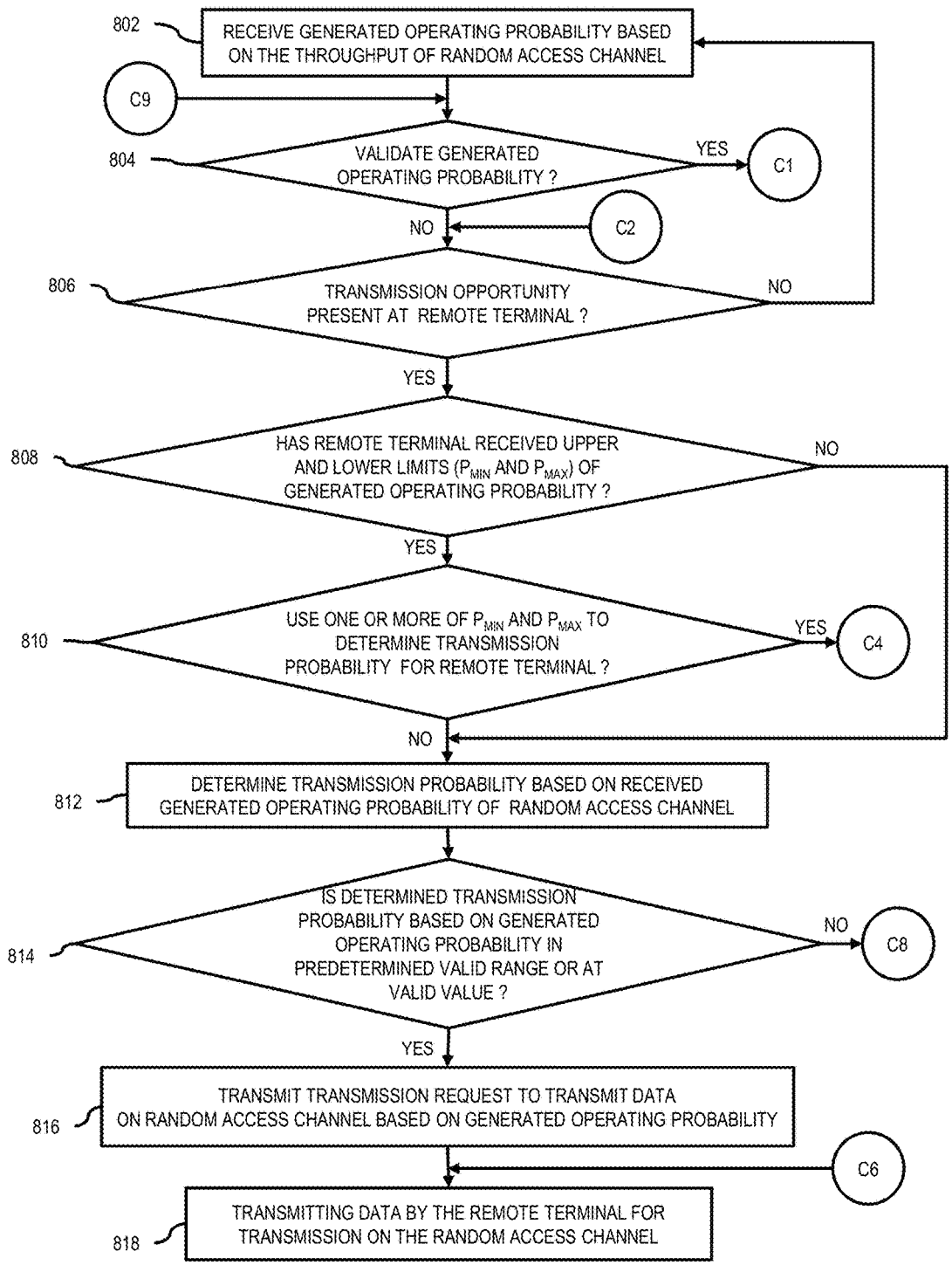
Figure 8B:
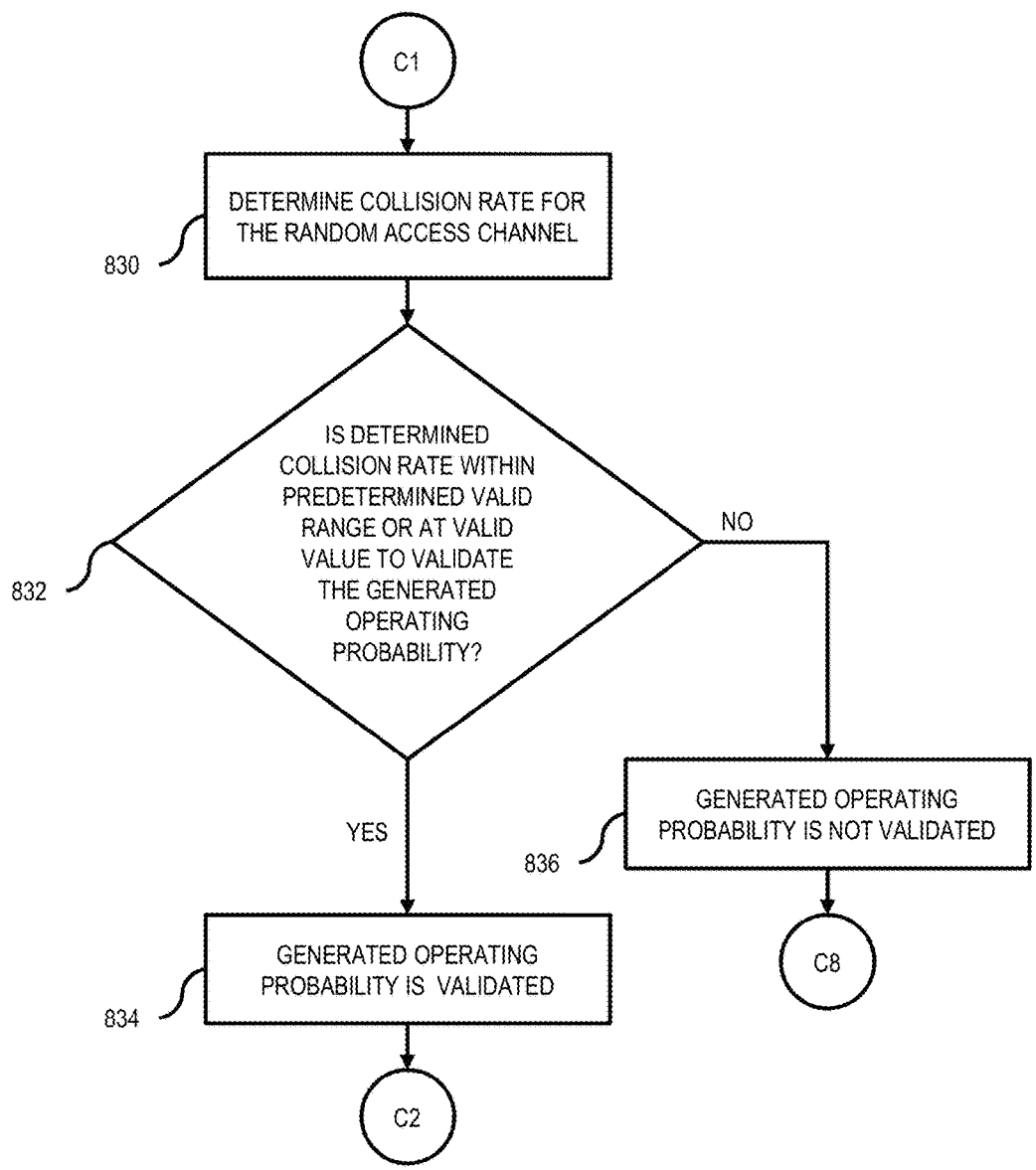
Figure 8C:
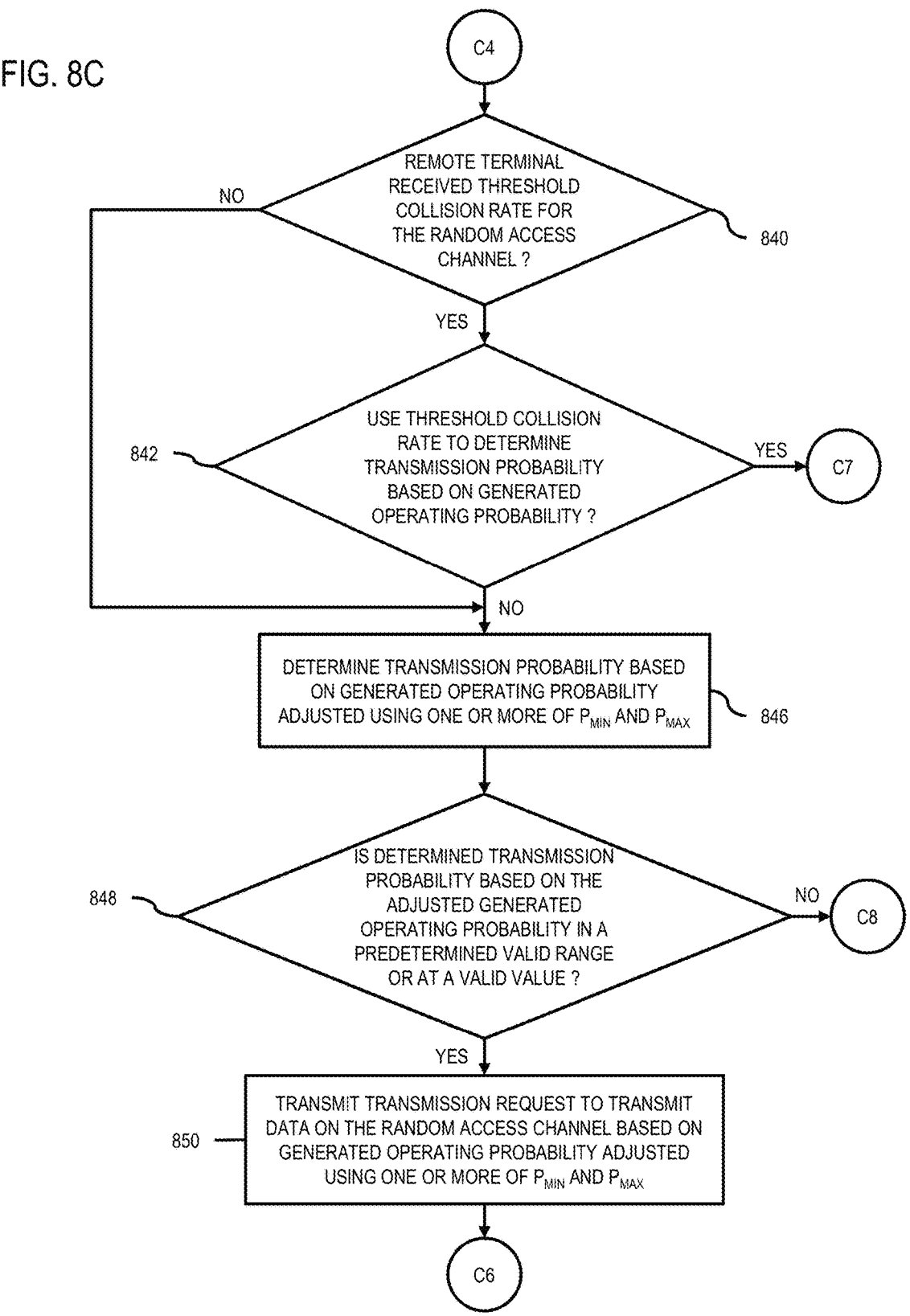
Figure 8E:
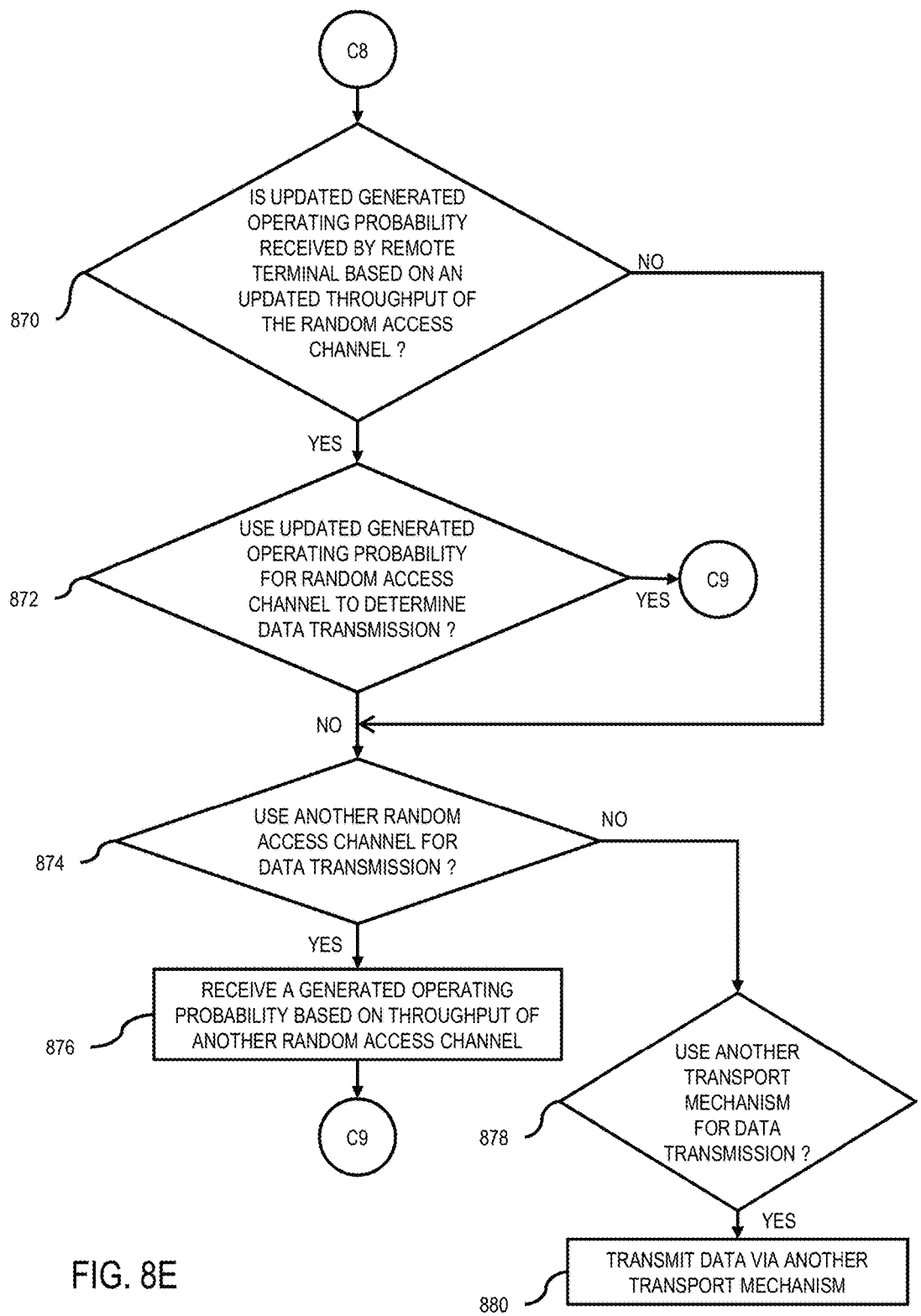

FIG. 7 depicts a flow chart illustrating an algorithm for dynamic load balancing using a generated operating probability for a random access channel based on its throughput as can be applied in the exemplary algorithms of FIGS. 6A-6C, in accordance with exemplary embodiments.

Referring to FIG. 7, at Step 702, the controller, such as an IGM, determines the instant throughput S(t) of the communications channel, such as the random access channel, for each of frames t in an updating period $T_0$ measured in frames (or in milliseconds), for example. At Step 704 the controller, such as an IGM, determines the $S_{EMA}$, the exponential moving average of instant throughput S(t) of time t for an updating period $T_0$. In satellite communications networks, for example, the unit of time is referred to as a "frame" which is 45 ms in a typical satellite system. At every frame t, typically S(t) is measured.

The averaging procedure at Step 704 for determining the exponential moving average $S_{EMA}$ of instant throughput is given by the following exemplary relation:

$S_{EMA}(t) = \alpha S(t) + (1-\alpha) S_{EMA}(t-1)$.

The default value for the configurable parameter $\alpha$ is 0.05, for example. This is equivalent to an averaging period of about 45 frames provided that the time constant $\tau$ of the exponential moving average EMA equals $$-\frac{T}{\ln(1-\alpha)} \text{ with } T = 1.$$

The initial value for S(t) at t=1 can be the actual measurement or zero if the measured value is not available, for example.

Then at Step 706, the controller, such as an IGM, determines values for upper and lower limits of the operating probability, $P_{min}$ and $P_{max}$. For example, the controller determines the operating probability as $P_{Aloha}(t)$ at time t, $P_{min} \leq P_{Aloha}(t) \leq P_{max}$, where $P_{min}$ and $P_{max}$ are the lower and upper limits. The default values are $P_{min}=0.005$ and $P_{max}=1.0$, for example. Also, the target throughput for the random access channels is $S_0$, and a tolerance range for the throughput is $\delta$, with the updating period $T_0$ in frames (or milliseconds).

At Step 708, the controller, such as an IGM, generates the operating probability based upon the determined throughput, which, for example, for Aloha channels is $P_{Aloha}(t)$. The generated operating probability $P_{Aloha}(t)$ is determined, and updated, for typically every updating period $T_0$ for transmission to the remote terminals, according to the following exemplary relations:

when $S_{EMA} > S_0(1+\delta)$, $P_{Aloha}(t) = \max [(1-\beta)P_{Aloha}(t-T_0), P_{min}]$;

when $S_{EMA} < S_0(1+\delta)$, $P_{Aloha}(t) = \max [(1-\beta)P_{Aloha}(t-T_0), P_{min}]$; and when $S_0(1-\delta) \leq S_{EMA} \leq S_0(1+\delta)$, $P_{Aloha}(t) = P_{Aloha}(t-T_0)$.

In the above relations for determining $P_{Aloha}(t)$, for example, the parameter value $\beta$ for the operating probability is typically set at $\beta=0.05$ and the tolerance range value $\delta$ for the target throughput for the random access channels typically is $\delta=0.15\sim0.2$ by default. The default value for $T_0$ can be around one round trip time (RTT), e.g., 500 ms or 12 frames. The initial value of operating probability typically is $P_{Aloha}(t)=1$ at t=1.

Then, at Step 710, the controller, such as an IGM, determines to transmit the generated operating probability $P_{Aloha}(t)$, determined for an updating period $T_0$, to the remote terminals. The updated generated operating probability $P_{Aloha}(t)$ is typically broadcast every frame to the remote terminals for Aloha channels. At step 712, the controller, such as an IGM, determines whether to update the operating probability $P_{Aloha}(t)$ (such as for another updating period $T_0$), and, if not, then process ends. The process, however, can return to Step 702 to repeat the process as to determining a current generated operating probability, such as at predetermined times.

However, at Step 712, if the controller, such as an IGM, determines to update the operating probability $P_{Aloha}(t)$, the process proceeds to Step 716 where the controller, such as an IGM, decides whether to reset the period of time that constitutes the updating period $T_0$ in which to determine the operating probability $P_{Aloha}(t)$. If not, the process returns to Step 702 to repeat the process as to determining a current generated operating probability, such as at predetermined times. But at Step 716, if the controller determines that the period of time that constitutes the updating period $T_0$ is to be reset to another, different period of time, the process proceeds to Step 718. At Step 718, the controller determines and resets the period of time that constitutes the updating period to a new period of time $T_{new}$ and now $T_0=T_{new}$. The process then returns to Step 702 to repeat the process as to determining a current generated operating probability, such as at predetermined times, with $T_0=T_{new}$, and proceeds as discussed above herein.

FIGS. 8A-8E depict flow charts illustrating algorithms for dynamic load balancing implemented at a remote terminal or a remote node in a communications system to determine a transmission probability at transmission opportunities using a received, generated operating probability based on determined throughput of Aloha channels in a satellite communications system, as examples of application of the methods and apparatus in communications systems, from the exemplary algorithms of FIGS. 6A-6C and 7, in accordance with exemplary embodiments and aspects of the invention.

Referring to FIGS. 8A-8E, at Step 802 one or more remote terminals receive from a controller, such as an IGM, a generated operating probability of a communications channel based on the throughput of the communications channel, such as a random access channel. At Step 804, the controller of a remote terminal decides whether to validate the received generated operating probability. If not, the process proceeds to Step 806, where the remote terminal controller decides whether a transmission opportunity is present to transmit data for transmission over the random access channel.

However, if, at Step 804, the remote terminal controller decides to validate the received generated operating probability, the process proceeds to Step 830. At step 830 the controller of the remote terminal determines a collision rate for the random access channels for which the generated operating probability was received. At Step 832, the remote terminal controller determines whether the determined collision rate is within a predetermined valid range or at a valid value to validate the received generated operating probability.

In this regard, as to Step 832, usually in the operational range, the throughput increases as the traffic load becomes higher; and vice versa. However, when the traffic load exceeds a certain level, the throughput moves contra, or against it, as, for example, illustrated in FIGS. 2-3. Such relationship can also be determined from the collision rate. When the collision rate is larger than a certain value, the throughput typically starts to decline, as shown in FIG. 5, for example. Therefore, the remote terminal, source or node can apply a sanity check based on the collision rate to validate the received generated operating probability. The rationale is that while the transmission is governed by the operating probability, the terminal is still able to detect the collision probability via its own transmission. And the terminal can derive a long term (e.g., 10 seconds to a few minutes) collision rate based on an unacknowledged number of packets.

If at Step 834 the remote terminal controller determines from its "sanity check" that the generated operating probability is validated as within the predetermined valid range or at a valid value based upon the remote terminals measured collision rate for the random access channel for which the generated operating probability was received, the process also then proceeds to Step 806, where the remote terminal controller decides whether a transmission opportunity is present to transmit data for transmission over the random access channel.

However, if at Step 836, the remote terminal determines from its "sanity check" that the generated operating probability is not validated as not within the predetermined valid range or not at a valid value based upon the remote terminal's measured collision rate for the random access channel for which the generated operating probability was received, the process then proceeds to Step 870. At Step 870, the remote terminal controller then determines whether an updated generated operating probability has been received by the remote terminal based on an updated throughput of the random access channel. If so, the process proceeds to Step 872, and the remote terminal controller decides whether to use the updated generated operating probability for the random access channel. If so, the process from Step 872 proceeds to return to Step 804, where again the remote terminal controller decides whether to determine whether the generated updated operating probability is valid, and the process then proceeds as previously described herein. However, if at Step 870 the controller determines than an updated generated operating probability has not been received by the remote terminal based on an updated throughput of the random access channel, the process then proceeds to Step 874.

However, if at Step 872 the remote terminal controller decides not to use the updated generated operating probability for the random access channel to determine data transmission, the process also then proceeds to Step 874. At Step 874, the remote terminal controller decides whether to use another, different random access channel for data transmission. If so, from Step 874, the process then proceeds to Step 876, where the remote terminal controller receives a generated operating probability based on the throughput of another, different random access channel. From Step 876, the process proceeds to return to Step 804, where again the remote terminal controller determines whether the generated updated operating probability is valid, and proceeds as previously described herein.

However, if at Step 874, the remote terminal controller decides not to use another, different random access channel for transmission, the process proceeds to Step 878. At Step 878, the remote terminal controller decides whether to use another transport mechanism for data transmission, and, if not, the process ends. The process, however, can return to Step 802 to repeat the process as to receiving a current generated operating probability, such as at predetermined times. However, if at Step 878, the controller determines to use another transport mechanism for data transmission, the process proceeds to Step 880 where the remote terminal transmits data using another transport mechanism, and, if not, the process ends. The process, however, can return to Step 802 to repeat the process as to receiving a current generated operating probability, such as at predetermined times.

The process in exemplary embodiments, as described above, upon returning to Step 806 determines by the remote terminal controller whether a transmission opportunity is present. If a transmission opportunity is not present, the process returns to step 802 to receive the generated operating probability. However, if at Step 806 a transmission opportunity is present to transmit data for transmission over the random access channel for which the generated operating probably has been received, the process proceeds to Step 808. At Step 808, the remote terminal controller determines whether it has received the upper and lower limits of the operating probability, $P_{min}$ and $P_{max}$, of the generated operating probability for the random access channel. If not, the process proceeds to Step 812.

At Step 812, the remote terminal controller determines a transmission probability of successfully transmitting data over the random access channel based on the received generated operating probability of the random access channel. Such determined transmission probability can be based on the above described "sanity check" or can compare the received operating probability with one or more predetermined values that correlate to a transmission probability, for example. Upon determining the transmission probability at Step 812, the process proceeds to Step 814. At Step 814, the remote terminal controller decides whether the determined transmission probability, based on the received generated operating probability, is in a predetermined valid range or at a valid value that indicates transmission of data for a particular type, class or priority, for example, should be undertaken over the random access channel. If so, the process proceeds to Step 816.

At Step 816, the remote terminal controller transmits a transmission request, such as to a controller that controls access to the random access channel, such as an IGM, to transmit data on the random access channel, based upon the received generated operating probability. The process then proceeds to Step 818. At Step 818 the remote terminal controller transmits data, to the controller that controls access to the random access channel, for transmission on the random access channel, where the process ends. The process, however, can return to Step 802 to repeat the process as to receiving a current generated operating probability, such as at predetermined times. However, if at Step 814, the remote terminal controller decides that the determined transmission probability, based on the received generated operating probability, is not in a predetermined valid range or not at a valid value, the process proceeds to Step 870 and continues as previously described herein.

However, if, at Step 808, the remote terminal controller determines it has received the upper and lower limits of the operating probability, $P_{min}$ and $P_{max}$, of the generated operating probability for the random access channel, the process proceeds to Step 810. At Step 810, the remote terminal controller then decides whether to use one or more of the upper and lower limits of the operating probability, $P_{min}$ and $P_{max}$, of the generated operating probability for the random access channel, to determine a transmission probability for the remote terminal to transmit data on the random access channel. If not, the proceeds to Step 812 and continues as previously described herein.

However, if, at Step 810, the remote terminal controller decides to use one or more of the upper and lower limits of the operating probability, $P_{min}$ and $P_{max}$, of the generated operating probability for the random access channel, to determine a transmission probability for the remote terminal to transmit data on the random access channel, the process proceeds to Step 840. At Step 840 the remote terminal controller determines whether it has received a threshold collision rate for the random access channel, such as from a controller that controls access to the random access channel, such as an IGM. If not, the process proceeds to Step 846.

At Step 846, the remote terminal controller can determine a transmission probability based on the received generated operating probability of the random access channel as can be adjusted by one or more of the upper and lower limits of the operating probability, $P_{min}$ and $P_{max}$, of the generated operating probability for the random access channel. If so, for example, where a user's service plan, such as a rate plan, would be considered in making such adjustment, then a scaling factor can be applied to the received generated operating probability $P_{Aloha}(t)$ adjusted by one or more of upper and lower limits of the operating probability, $P_{min}$ and $P_{max}$, of the generated operating probability to reflect the service plan to determine an adjusted operating probability to correlate with a transmission probability for the user's service plan.

For example, at Step 846, the generated operating probability $P_{Aloha}(t)$ has been received by the remote terminal controller. The remote terminal controller provides data transmission services for one or more rate plans where, for example, $R_i$ is a rate plan i, and $R_0$ is the base plan (for example, the base plan is 1M bps and rate plan 2 is 2M bps, etc.). And a remote terminal with plan rate R in this example will have the generated operating probability $P_{Aloha}(t)$ given by and adjusted as follows:

$$P_{Aloha}^{(i)}(t) = \min\left[\frac{R_i}{R_0}P_{Aloha}(t), P_{max}\right].$$

At Step 846, the remote terminal controller further determines a transmission probability of successfully transmitting data over the random access channel based on the adjusted generated operating probability of the random access channel. Such determined transmission probability can be based on the above described "sanity check" or can compare the adjusted operating probability with one or more predetermined values that correlate to a transmission probability, for example.

Upon determining the transmission probability at Step 846, the process proceeds to Step 848. At Step 848, the remote terminal controller decides whether the determined transmission probability, based on the adjusted generated operating probability, is in a predetermined valid range or at a valid value that indicates transmission of data for a particular type, class or priority, for example, should be undertaken over the random access channel. If not, the proceeds to Step 870 and continues as previously described herein. However, if so, the process proceeds from Step 848 to Step 850.

At Step 850, the remote terminal controller transmits a transmission request, such as to a controller that controls access to the random access channel, such as an IGM, to transmit data on the random access channel, based upon the generated operating probability adjusted by one or more of upper and lower limits of the operating probability, $P_{min}$ and $P_{max}$, of the generated operating probability. The process then proceeds from Step 850 to Step 818. At Step 818 the remote terminal controller transmits data, to the controller that controls access to the random access channel, for transmission on the random access channel, where the process ends. The process, however, can return to Step 802 to repeat the process as to receiving a current generated operating probability, such as at predetermined times.

However, if at Step 840 the terminal remote controller determines it has received a threshold collision rate for the random access channel, the process then proceeds to Step 842. At Step 842, the remote terminal decides whether it will use the received threshold collision rate to determine a transmission probability based on the generated operating probability. At Step 842, if the terminal remote controller decides not to use the received threshold collision rate to determine a transmission probability based on the generated operating probability, the process proceeds to Step 846 and continues as described above herein. However, if at Step 842 the terminal remote controller decides to use the received threshold collision rate to determine a transmission probability based on the generated operating probability, the process proceeds to Step 860.

At Step 860, the remote terminal controller can determine a transmission probability based on the received generated operating probability of the random access channel as can be adjusted by one or more of the upper limit of the operating probability ($P_{max}$), the lower limit of the operating probability ($P_{min}$) or the threshold collision rate for the random access channel.

At Step 860, for example, the received generated operating probability $P_{Aloha}(t)$ can be adjusted by a scaling factor based upon one or more of upper and lower limits of the operating probability, $P_{min}$ and $P_{max}$, of the generated operating probability to reflect the service plan to determine an adjusted operating probability to correlate with a transmission probability for the user's service plan, as discussed previously herein. Also, at Step 860, the received generated operating probability $P_{Aloha}(t)$ can be adjusted using the received threshold collision rate for the random access channel. For example, when the terminal measured collision rate is larger than the threshold collision rate, the terminal can set the Aloha operating probability to $P_{min}$; and, alternatively, when the terminal measured collision rate is smaller than the threshold collision rate, the terminal can set the Aloha operating probability to $P_{max}$.

Further, alternatively, the remote terminal controller or the terminal transmitting the threshold collision rate to the remote terminal, can set the value for the threshold of the collision rate, which typically can be set around 0.40 for Aloha Channels, for example, for use in adjusting the received generated operating probability. As evident from the foregoing, various exemplary adjustment methods can be used alone or in various combinations, or other adjustment methods can be used alone or in combination, to adjust the generated operating probability by one or more of the upper and lower limits of the operating probability, $P_{min}$ and $P_{max}$, of the generated operating probability or the threshold collision rate for the random access channel. Then, at Step 860, the remote control terminal determines a transmission probability that correlates with the adjusted operating probability. The process then proceeds to Step 862.

At Step 862, the remote terminal controller decides whether the determined transmission probability, based on the adjusted generated operating probability, is in a predetermined valid range or at a valid value that indicates transmission of data for a particular type, class or priority, for example, should be undertaken over the random access channel. At Step 862, if the remote terminal controller determines that transmission probability, based on the adjusted generated operating probability, is not in a predetermined valid range or not at a valid value that indicates transmission of data should be undertaken over the random access channel, the process proceeds to Step 870 and continues as previously described herein. However, if, at Step 862, the remote terminal controller determines that the transmission probability, based on the adjusted generated operating probability, is in a predetermined valid range or at a valid value that indicates transmission of data should be undertaken over the random access channel, the process proceeds to Step 864.

At Step 864, the remote terminal controller transmits a transmission request, such as to a controller that controls access to the random access channel, such as an IGM, to transmit data on the random access channel, based upon the generated operating probability adjusted by one or more of the upper limit of the operating probability ($P_{max}$), the lower limit of the operating probability ($P_{min}$) or the threshold collision rate for the random access channel. The process then proceeds from Step 864 to Step 818. At Step 818 the remote terminal controller transmits data, to the controller that controls access to the random access channel, for transmission on the random access channel, where the process ends. The process, however, can return to Step 802 to repeat the process as to receiving a current generated operating probability, such as at predetermined times.

As evident from the foregoing discussion, while the above described exemplary embodiments specifically describe aspects of method and apparatus for controlling traffic load based upon a generated operating probability based upon a determined collision rate for a communications channel, such as a random access channel, other traffic policies can be applied in conjunction with the aforementioned aspects of the invention in load balancing, such as in attempting to maintain a reasonable quality of service and high throughput. Such traffic policies include, among others, for example: having a remote terminal modify its probability of transmission; having a remote terminal change the set of random access channels it is attempting to utilize (e.g., select a different set with similar characteristics or change physical characteristics as in selecting a different symbol rate that is less loaded); having a remote terminal change its protocol (e.g., utilizing or not utilizing Diversity Aloha); having a remote terminal divert traffic to utilize another transport mechanism other than random access (e.g., TDMA); having a remote terminal block traffic of a certain class; and having a remote terminal change its classification criteria (e.g., packet size) for admitting traffic onto a high priority traffic class.

Figure 9:
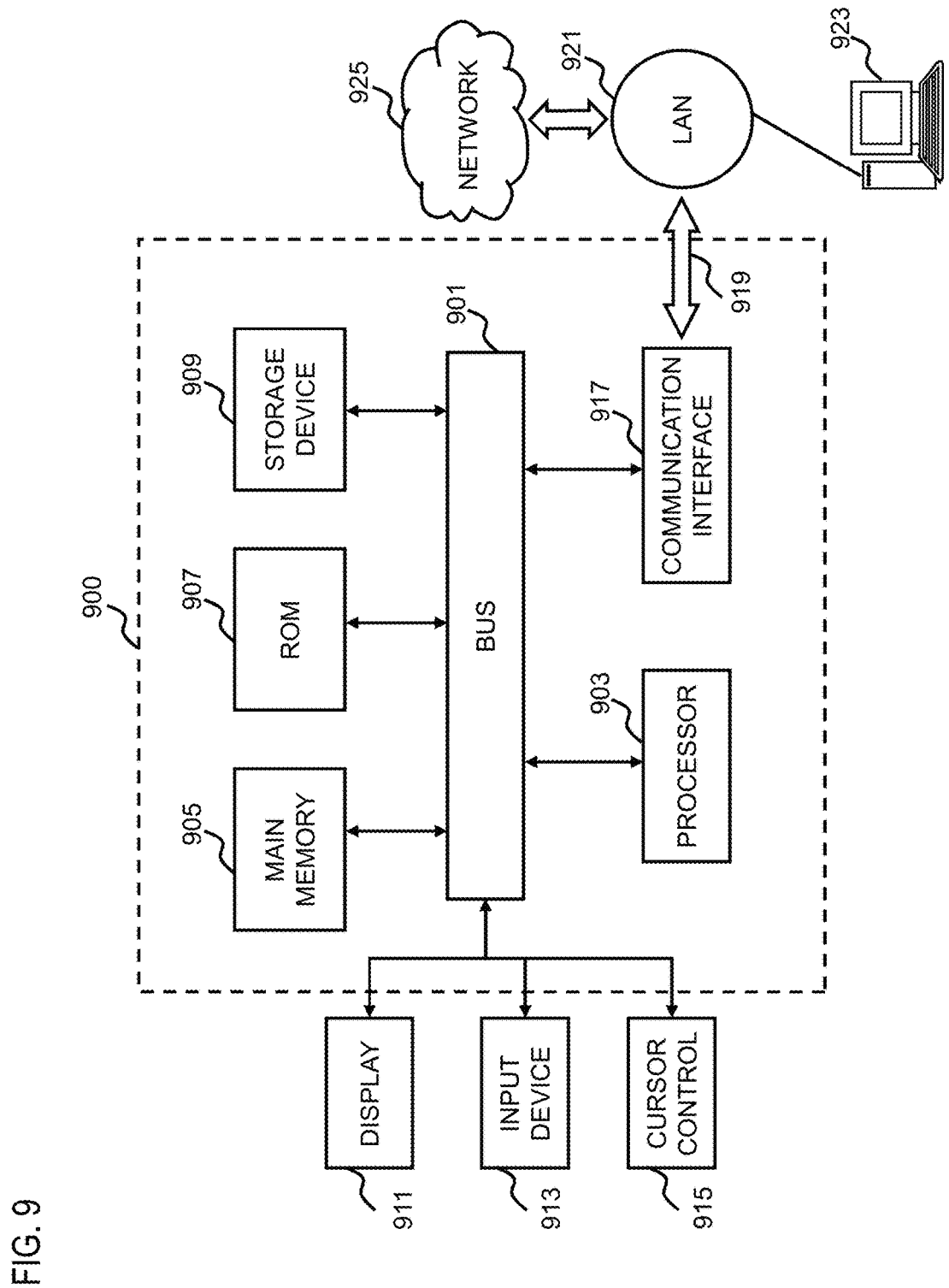
FIG. 9 depicts a diagram of a computer system on which architectures and methods for dynamic load balancing of traffic loads transmitted from remote terminals or remote nodes can be implemented, according to exemplary embodiments.

FIG. 9 illustrates a computer system, or controller, 900 upon which exemplary embodiments according to the present invention can be implemented, such as a controller of a remote terminal or as a controller that controls access for transmission over the communications channel, such as a random access channel, e.g., Aloha channels, in a communications system, such as satellite or computer network communications systems. The computer system 900 includes a bus 901 or other communications mechanism for communicating information, and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions to be executed by the processor 903. The computer system 900 further includes a read only memory (ROM) 907 or other static storage device coupled to the bus 901 for storing static information and instructions for the processor 903. A storage device 909, such as a magnetic disk or optical disk, is additionally coupled to the bus 901 for storing information and instructions.

The computer system 900 can be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is cursor control 915, such as a mouse, a trackball, or cursor direction keys for communicating direction information and command selections to the processor 903 and for controlling cursor movement on the display 911.

According to aspects of exemplary embodiments of the invention, dynamic and flexible architectures, apparatus and methods for implementing load balancing, in accordance with exemplary embodiments, are provided by the computer system 900 in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement can also be employed to execute the instructions contained in main memory 905. In alternative embodiments, hard-wired circuitry can be used in place of or in combination with software instructions to implement embodiments and aspects of the invention. Thus, embodiments of the present invention are not limited to any specific combination of hardware circuitry and software.

The computer system 900 also includes a communications interface 917 coupled to bus 901. The communications interface 917 provides a two-way data communications, such as coupling to a network link 919 connected to a local network 921 or to or from remote terminals or controllers of communications systems. For example, the communications interface 917 can be a digital subscriber line (DSL) card or modem, an integrated services digital network (ISDN) card, a cable modem, or a telephone modem to provide a data communications connection to a corresponding type of telephone line. As another example, communications interface 917 can be a local area network (LAN) card (e.g., for Ethernet™ or an Asynchronous Transfer Model (ATM) network) to provide a data communications connection to a compatible LAN. Wireless links, such as for satellite communications systems, can also be implemented. In any such implementation, communications interface 917 sends and receives electrical, electromagnetic, or optical signals that carry digital data streams representing various types of information. Further, the communications interface 917 can include peripheral interface devices, such as a Universal Serial Bus (USB) interface, a PCMCIA (Personal Computer Memory Card International Association) interface, etc.

The network link 919 typically provides data communications through one or more networks to other data devices. For example, the network link 919 can provide a connection through local network 921 to a host computer 923, which has connectivity to a network 925 (e.g., a wide area network (WAN) or the global packet data communications network now commonly referred to as the "Internet") or to data equipment operated by service provider. The local network 921 and network 925 both use electrical, electromagnetic, or optical signals to convey information and instructions. The signals through the various networks and the signals on network link 919 and through communications interface 917, which communicate digital data with computer system 900, are exemplary forms of carrier waves bearing the information and instructions.

The computer system 900 can send messages and receive data, including program code, through the network(s), network link 919, and communications interface 917. In the Internet example, a server (not shown) can transmit requested code belonging to an application program for implementing an embodiment of the present invention through the network 925, local network 921 and communications interface 917. The processor 903 can execute the transmitted code while being received and/or store the code in storage device 909, or other non-volatile storage for later execution. In this manner, computer system 900 can obtain application code in the form of a carrier wave.

The term "computer-readable medium" as used herein refers to any medium that participates in providing instructions to the processor 903 for execution. Such a medium can take many forms, including but not limited to non-volatile media, volatile media, and transmission media. Non-volatile media include, for example, optical or magnetic disks, such as storage device 909. Volatile media include dynamic memory, such as main memory 905. Transmission media include coaxial cables, copper wire and fiber optics, including the wires that comprise bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media can be involved in providing instructions to a processor for execution. For example, the instructions for carrying out at least part of the present invention can initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by a processor.

FIG. 10 illustrates an exemplary chip set, or controller, 1000 in or upon which exemplary embodiments according to and aspects of the invention can be implemented, such as a controller of a remote terminal or as a controller that controls access for transmission over the communications channel, such as a random access channel, e.g., Aloha channels, in a communications system, such as satellite or computer network communications systems. Chip set 1000 includes, for instance, processor and memory components described with respect to FIG. 10 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one exemplary embodiment, the chip set 1000 includes a communications mechanism such as a bus 1001 for passing information among the components of the chip set 1000 or to or from outside the chipset. A processor 1003 has connectivity to the bus 1001 to execute instructions and process information stored in, for example, a memory 1005. The processor 1003 can include one or more processing cores with each core configured to perform independently. A multi-core processor enables multiprocessing within a single physical package. Examples of a multi-core processor include two, four, eight, or greater numbers of processing cores. Alternatively or in addition, the processor 1003 can include one or more microprocessors configured in tandem via the bus 1001 to enable independent execution of instructions, pipelining, and multithreading. The processor 1003 can also be accompanied with one or more specialized components to perform certain processing functions and tasks such as one or more digital signal processors (DSP) 1007, and/or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions and aspects described herein include one or more field programmable gate arrays (FPGA) (not shown), one or more controllers, or one or more other special-purpose computer chips.

The processor 1003 and accompanying components have connectivity to the memory 1005 via the bus 1001. The memory 1005 includes both dynamic memory (e.g., RAM) and static memory (e.g., ROM) for storing executable instructions that, when executed by the processor 1003 and/or the DSP 1007 and/or the ASIC 1009, perform the processes of exemplary embodiments as described herein. The memory 1005 also stores the data associated with or generated by the execution of the processes.

The methods, apparatus and aspects of the invention can be applied to various communications networks, such as, for example, those that utilize a contention based access method for some or all of the traffic, including control traffic. The dynamic load balancing aspects of the invention are particularly useful for the transmission of data with large round trip time (RTT). Various aspects of the exemplary methods and apparatus described herein can be implemented in the Jupiter Satellite System and its variants, for example.

In the preceding specification, various exemplary embodiments and aspects of the invention have been described with reference to the accompanying drawings. By way of example, flow control for Aloha channels with targeted latency and throughput have been discussed in relation to dynamic load balancing with respect to aspects of the invention that promotes usage of Aloha channels in a targeted operational range with a desired collision rate. It will, however, be evident that various modifications and changes can be made thereto, and additional embodiments can be implemented, without departing from the broader scope of the invention as set forth in the claims that follow. The specification and drawings are accordingly to be regarded in an illustrative rather than restrictive sense.

What is claimed is:

1. A method for load balancing of data communications across a plurality of random access channels of a data communications network by a plurality of terminals, the method comprising:
   determining, by a gateway device of the data communications network, a throughput for each of the plurality of random access channels of the data communications network, wherein each random access channel provides communications bandwidth to each of the plurality of terminals for transmission of data within the data communications network;
   determining, by the gateway device, an operating probability for each random access channel based at least in part on the respective determined throughput for the random access channel, wherein the operating probability reflects information concerning likelihood for successful data transmissions over the respective random access channel by each of the terminals;
   determining, by the gateway device, a threshold collision rate for each of the plurality of random access channels; and
   transmitting, by the gateway device, the determined operating probability and threshold collision rate, for each of the plurality of random access channels, to each of the plurality of terminals, for each of the terminals to adjust the determined operating probability for each the random access channels based at least in part on the respective threshold collision rate and to control a respective rate of data transmissions of the terminal over each of one or more of the random access channels based on the respective adjusted operating probability.

2. A method according to claim 1, wherein the transmission of data over each of the one or more of the random access channels by each of the terminals is according to an Aloha protocol or a diversity Aloha protocol.

3. A method according to claim 1, wherein the generation of the operating probability for each random access channel is based at least in part on a comparison of the determined throughput for the random access channel with a respective predetermined target throughput.

4. A method according to claim 1, further comprising:
   determining, by the gateway device, an upper limit and a lower limit for the operating probability for each random access channel, wherein the generation of the operating probability for the random access channel includes an adjustment based on one or more of the upper limit and the lower limit for the respective operating probability.

5. A method according to claim 1, further comprising:
   receiving a transmission request from at least one of the plurality of terminals based at least in part on the operating probabilities.

6. A method according to claim 1, wherein the determination of the throughput for each random access channel comprises:
   determining an instant throughput of the random access channel at a plurality of times over a predetermined time period; and
   determining a moving average of the instant throughput over the predetermined time period; and
   wherein the generation of the operating probability for the random access channel comprises generating the operating probability for the random access channel for the predetermined time period based at least in part on the moving average of the instant throughput for the predetermined time period.

7. A method according to claim 6, wherein the generation of the operating probability for each random access channel further comprises:
determining an upper limit and a lower limit for the operating probability for the random access channel, wherein the generation of the operating probability for the random access channel for the predetermined time period includes an adjustment based on one or more of the upper limit and the lower limit for the respective operating probability, based at least in part on a comparison of the moving average of the instant throughput with a respective predetermined target throughput.

8. A method according to claim 1, wherein the generation of the operating probability for each random access channel comprises:
determining an upper limit and a lower limit for the operating probability for the random access channel, wherein the generation of the operating probability for the random access channel includes an adjustment based on one or more of the upper limit and the lower limit for the respective operating probability.

9. A method according to claim 8, further comprising:
transmitting the determined upper limit and lower limit for the operating probability for each random access channel to each of the plurality of terminals; and
receiving a transmission request from at least one of the plurality of terminals based at least in part on the operating probabilities, each as adjusted by the at least one terminal based on one or more of the upper limit and the lower limit for the respective operating probability for the respective random access channel.

10. A method according to claim 1, wherein:
the determination of the throughput for each random access channel is periodically performed based on a predetermined update period;
the operating probability for each random access channel is generated, for each update period, based at least in part on the determined throughput for the random access channel for the respective update period; and
the generated operating probability for each random access channel is transmitted, for each update period, to the plurality of terminals for each of one or more of the terminals to control the respective rate of data transmissions of the terminal over each random access channel and balance the data transmission load of the terminal across the plurality of random access channels based on the respective operating probabilities, during the respective update period.

11. A method according to claim 1, wherein the communications network comprises a satellite communications system.

12. A method for load balancing of data communications across a plurality of random access channels of a data communications network by a network terminal, the method comprising:
receiving, by the network terminal, an operating probability for each of the plurality of random access channels, wherein each random access channel provides communications bandwidth to the network terminal for transmission of data within the data communications network, and wherein, for each random access channel, the operating probability is based on an operating throughput of the random access channel and reflects information concerning likelihood for successful data transmissions by the network terminal over the random access channel;
receiving, by the network terminal, a threshold collision rate for each of the plurality of random access channels;
adjusting the operating probability for each random access channel based at least in part on the respective threshold collision rate for the random access channel;
determining, by the network terminal, a transmission probability for each random access channel based at least in part on the respective operating probability as adjusted based on the respective threshold collision rate; and
controlling, by the network terminal, a respective rate of data transmissions over each of one or more of the random access channels based at least in part on the respective determined transmission probability.

13. A method according to claim 12, further comprising:
receiving, by the network terminal, an upper limit and a lower limit for the operating probability for each random access channel, wherein the transmission probability for each random access channel is determined based at least in part on the respective operating probability as adjusted by one or more of the respective upper limit and the respective lower limit.

14. A method for controlling traffic load in a communications system according to claim 12, wherein the communications network is a satellite communications system.

15. An apparatus of a gateway of a data communications network, the apparatus comprising:
at least one processor; and
at least one memory including computer program code, and
wherein the at least one memory and the computer program code are configured to, with the at least one processor, cause the apparatus to perform at least the following,
determine a throughput for each of the plurality of random access channels of the data communications network, wherein each random access channel provides communications bandwidth to each of a plurality of terminals for transmission of data within the data communications network,
determine an operating probability for each random access channel based at least in part on the respective determined throughput for the random access channel, wherein the operating probability reflects information concerning likelihood for successful data transmissions over the respective random access channel by each of the terminals,
determining, by the gateway device, a threshold collision rate for each of the plurality of random access channels; and
transmit the determined operating probability and threshold collision rate, for each of the plurality of random access channels, to each of the plurality of terminals, for each of the terminals to adjust the determined operating probability for each of the random access channels based at least in part on the respective threshold collision rate and to control a respective rate of data transmissions of the terminal over each of one or more of the random access channels based on the respective adjusted operating probability.

16. An apparatus according to claim 15, wherein the transmission of data over each of the one or more of the random access channels by each of the terminals is according to an Aloha protocol or a diversity Aloha protocol.

17. An apparatus according to claim 15, wherein the generation of the operating probability for each random access channel is based at least in part on a comparison of the determined throughput for the random access channel with a respective predetermined target throughput.

18. An apparatus according to claim 15, wherein the apparatus is further caused to:
determine an upper limit and a lower limit for the operating probability for each random access channel, wherein the generation of the operating probability for the random access channel includes an adjustment based on one or more of the upper limit and the lower limit for the respective operating probability.

19. An apparatus according to claim 15, wherein the determination of the throughput for each random access channel comprises:
determining an instant throughput of the random access channel at a plurality of times over a predetermined time period; and
determining a moving average of the instant throughput over the predetermined time period; and
wherein the generation of the operating probability for the random access channel comprises generating the operating probability for the random access channel for the predetermined time period based at least in part on the moving average of the instant throughput for the predetermined time period.

20. An apparatus according to claim 19, wherein the generation of the operating probability for each random access channel further comprises:
determining an upper limit and a lower limit for the operating probability for the random access channel, wherein the generation of the operating probability for the random access channel for the predetermined time period includes an adjustment based on one or more of the upper limit and the lower limit for the respective operating probability, based at least in part on a comparison of the moving average of the instant throughput with a respective predetermined target throughput.

21. An apparatus according to claim 15, wherein the generation of the operating probability for each random access channel comprises:
determining an upper limit and a lower limit for the operating probability for the random access channel, wherein the generation of the operating probability for the random access channel includes an adjustment based on one or more of the upper limit and the lower limit for the respective operating probability.

22. An apparatus according to claim 15, wherein:
the determination of the throughput for each random access channel is periodically performed based on a predetermined update period;
the operating probability for each random access channel is generated, for each update period, based at least in part on the determined throughput for the random access channel for the respective update period; and
the generated operating probability for each random access channel is transmitted, for each update period, to the plurality of terminals for each of one or more of the terminals to control the respective rate of data transmissions of the terminal over each random access channel and balance the data transmission load of the terminal across the plurality of random access channels based on the respective operating probabilities, during the respective update period.

23. An apparatus according to claim 15, wherein the communications network comprises a satellite communications system.

24. A communications terminal of a data communications network, the communications terminal comprising:
at least one processor; and
at least one memory including computer program code, and
wherein the at least one memory and the computer program code are configured to, with the at least one processor, cause the apparatus to perform at least the following,
receive an operating probability for each of a plurality of random access channels of the data communications network, wherein each random access channel provides communications bandwidth to the communications terminal for transmission of data within the data communications network, and wherein, for each random access channel, the operating probability is based on an operating throughput of the random access channel and reflects information concerning likelihood for successful data transmissions by the network terminal over the random access channel,
receive a threshold collision rate for each of the plurality of random access channels;
adjust the operating probability for each random access channel based at least in part on the respective threshold collision rate for the random access channel;
determine a transmission probability for each random access channel based at least in part on the respective operating probability as adjusted based on the respective threshold collision rate, and
control a respective rate of data transmissions over each of one or more of the random access channels based at least in part on the respective determined transmission probability.

25. An apparatus according to claim 24, wherein the communications terminal apparatus is further caused to:
receive an upper limit and a lower limit for the operating probability for each random access channel, wherein the transmission probability for each random access channel is determined based at least in part on the respective operating probability as adjusted by one or more of the respective upper limit and the respective lower limit.

* * * * *